United States Patent
Dion

(10) Patent No.: US 10,233,705 B2
(45) Date of Patent: *Mar. 19, 2019

(54) REEL CONTROL SYSTEMS WITH DATA LOGGING

(71) Applicant: PATCO Machine & Fab., Inc., Houston, TX (US)

(72) Inventor: Dennis Dion, Spring, TX (US)

(73) Assignee: PATCO Machine & Fab., Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,638

(22) Filed: Oct. 3, 2017

(65) Prior Publication Data
US 2018/0023354 A1 Jan. 25, 2018

Related U.S. Application Data

(63) Continuation-in-part of application No. 14/945,195, filed on Nov. 18, 2015, now Pat. No. 9,810,032.
(Continued)

(51) Int. Cl.
*E21B 19/22* (2006.01)
*B65H 75/44* (2006.01)
(Continued)

(52) U.S. Cl.
CPC ............. *E21B 19/22* (2013.01); *B65H 75/38* (2013.01); *B65H 75/4489* (2013.01);
(Continued)

(58) Field of Classification Search
CPC ............ B65H 2551/10; B65H 2557/11; B65H 2701/33; B65H 2701/34; B65H 75/38;
(Continued)

(56) References Cited

U.S. PATENT DOCUMENTS

| | | |
|---|---|---|
| 2,548,616 A | 4/1951 | Priestman et al. |
| 3,190,307 A | 6/1965 | de Vries |

(Continued)

FOREIGN PATENT DOCUMENTS

| | | |
|---|---|---|
| BE | 1006560 A6 | 10/1994 |
| CN | 201934087 U | 8/2011 |

(Continued)

OTHER PUBLICATIONS

Red Rooster Industrial (UK) Ltd, Hosereel/Umbilical/Transponder Winches, http://www.swlrooster.co.uk/poweredwinches_transponder.htm, last accessed Jul. 13, 2015.
(Continued)

*Primary Examiner* — James G Sayre
(74) *Attorney, Agent, or Firm* — Beem Patent Law Firm

(57) ABSTRACT

An electronic control unit may, based on received sensor data, automatically direct the operation of a reel assembly for deploying a cable, hose or umbilical connection. The electronic control unit may operate in conjunction with an electro-pneumatic drive to control the reel assembly. Sensors may measure various parameters, such as a measured line tension and/or a length of cable, hose or umbilical connection that has been deployed, and transmit the measured data to the electronic control unit. Optionally, the sensor data and/or user control inputs and system status information may be logged. The system also may use this data to control the system, such as by activating an alarm when a certain alarm limit is exceeded by the data, adjusting the pressure or other parameters of the electro-pneumatic drive, and the like. The system also may generate a visual notification for an operator when an alarm is triggered.

19 Claims, 19 Drawing Sheets

Fig.1A

Related U.S. Application Data which is a continuation of application No. 14/802,814, filed on Jul. 17, 2015, now Pat. No. 9,206,658.

(60) Provisional application No. 62/404,011, filed on Oct. 4, 2016.

(51) Int. Cl.
*G05B 15/02* (2006.01)
*E21B 33/064* (2006.01)
*B65H 75/38* (2006.01)

(52) U.S. Cl.
CPC .......... *E21B 33/064* (2013.01); *G05B 15/02* (2013.01); *B65H 2551/10* (2013.01); *B65H 2557/11* (2013.01); *B65H 2701/33* (2013.01); *B65H 2701/34* (2013.01)

(58) Field of Classification Search
CPC ... B65H 75/4489; E21B 19/22; E21B 33/064; G05B 15/02
See application file for complete search history.

(56) References Cited

U.S. PATENT DOCUMENTS

| | | | |
|---|---|---|---|
| 3,313,346 A | 4/1967 | Cross | |
| 3,481,584 A | 12/1969 | Robertson | |
| 4,475,163 A | 10/1984 | Chandler et al. | |
| 4,669,145 A * | 6/1987 | Kehr | B65H 75/425 134/166 C |
| 5,176,364 A | 1/1993 | Bell | |
| 5,373,925 A | 12/1994 | Handford | |
| 5,458,048 A * | 10/1995 | Hohner | F15B 13/0814 137/624.2 |
| 5,950,953 A | 9/1999 | Baugh et al. | |
| 6,216,789 B1 * | 4/2001 | Lorsignol | B66D 1/505 166/355 |
| 6,932,325 B1 | 8/2005 | Selcer et al. | |
| 7,210,647 B2 | 5/2007 | Dion | |
| 7,363,968 B1 | 4/2008 | Baugh | |
| 7,967,234 B2 | 6/2011 | Baugh | |
| 8,061,644 B1 | 11/2011 | Dion | |
| 8,352,210 B2 | 1/2013 | Kranz | |
| 8,763,709 B2 | 7/2014 | Shampine | |
| 8,820,399 B2 | 9/2014 | Witte et al. | |
| 9,206,658 B1 * | 12/2015 | Dion | E21B 19/22 |
| 9,810,032 B2 * | 11/2017 | Dion | E21B 19/22 |
| 2006/0000936 A1 | 1/2006 | Caamano et al. | |
| 2007/0152093 A1 | 7/2007 | Hartzheim | |
| 2011/0006149 A1 | 1/2011 | Baugh | |
| 2011/0006150 A1 | 1/2011 | Baugh | |
| 2011/0198431 A1 | 8/2011 | Baugh | |
| 2012/0267466 A1 | 10/2012 | Tracey et al. | |
| 2013/0161441 A1 | 6/2013 | Bjomenak et al. | |
| 2014/0216735 A1 | 8/2014 | Bell et al. | |
| 2015/0083843 A1 | 3/2015 | Rekieta et al. | |
| 2015/0371741 A1 * | 12/2015 | Leggett | B65H 59/16 432/3 |
| 2016/0362945 A1 | 12/2016 | Baugh | |
| 2016/0362946 A1 | 12/2016 | Baugh | |
| 2016/0362947 A1 | 12/2016 | Baugh | |
| 2016/0362948 A1 | 12/2016 | Baugh | |

FOREIGN PATENT DOCUMENTS

| | | |
|---|---|---|
| CN | 102756952 A | 10/2012 |
| GB | 816845 A | 7/1959 |
| KR | 10-2012-0138357 | 12/2012 |
| KR | 20120138357 A | 12/2012 |
| WO | 2009032601 A1 | 3/2009 |
| WO | 2012034460 A1 | 3/2012 |
| WO | 2016200437 | 12/2016 |

OTHER PUBLICATIONS

Red Rooster Industrial (UK) Ltd, Offshore Air Winches 0AW/OMR Series, http://www.swlrooster.co.uk/poweredwinches_offshoreair.htm, last accessed Jul. 13, 2015.
Ingersol Rand, Winches and High Capacity Hoists, http://www.ingersollrandproducts.com/liffing/AirWinch%20Catalog.pdf, last accessed Jul. 13, 2015.
PATCO Machine & Fab., Inc., Equipment, http://www.patcomachandfab.com/equipment.html, last accessed Jul. 17, 2015.
PATCO Machine & Fab., Inc., Products, http://www.patcomachandfab.com/product.html, last accessed Jul. 17, 2015.
Notification of Transmittal of the International Search Report and Written Opinion dated Sep. 22, 2016, issued in International Application No. PCT/US2016/036323 (10 pages).
Dion, Dennis, "42054-R0_Sht_1_Control_Panel_Assembly", dated Apr. 18, 2006.
Dion, Dennis, "42051-R4_Pneumatic_Schematic", dated Oct. 20, 2005, with various subsequent revisions.
Dion, Dennis, "42050-R7_General_Assembly", dated Sep. 14, 2005, with various subsequent revisions.

* cited by examiner

REEL CONTROL SYSTEMS WITH DATA LOGGING

This application is a continuation in part of and claims benefit of priority from U.S. patent application Ser. No. 14/945,195 filed Nov. 18, 2015, which is incorporated by reference in its entirety which is further a continuation of U.S. patent application Ser. No. 14/802,814 filed Jul. 17, 2015, now U.S. Pat. No. 9,206,658, which is incorporated by reference in its entirety. This application also claims priority to U.S. Provisional Patent Application No. 62/404,011 filed Oct. 4, 2016, which is incorporated by reference in its entirety.

BACKGROUND OF THE INVENTION

1. Technical Field

The present application relates to reel systems for the receiving, storage, and deploying of cables (such as one or more electrical lines), hoses, umbilical connections (such as bundles of hydraulic lines, electrical lines, cables, hoses, and/or combinations thereof) and the like that can store operator inputs and collected, real time data.

2. Related Art

Subsea blowout prevention equipment (BOP) uses large, specialized valves or similar mechanical devices, usually installed redundantly in stacks, to seal, control and monitor oil and gas wells. Redundant sub-sea control pods are used to control the valves of the BOP stack, some of which are referred to in the industry as blue and yellow pods. The pods of the BOP stack are controlled by cables, hoses, umbilical connections and the like with various capacity outside diameters. The reel systems used for winding the cable, hoses, umbilical connections and the like onto spools, particularly on off-shore drill rigs, employ spools which are mechanically driven.

Off-shore drill rigs often use multiplex cable reels, hot line hose reels, riser fill valve hose reels and the like in control systems for BOP equipment. Each of these components may provide various functionalities. In a typical rig, four spools may provide control cables for a BOP stack. These components may function as follows: multiplex cable reel assemblies may be used to pay out and retrieve multiplex cables that may be used to transmit electric signals to allow for the control of sub-sea hydraulic functions on the sub-sea blue and yellow pods; a hot line hose reel assembly may be used to pay out and retrieve a hose that provides hydraulic fluid from the drilling rig deck to the sub-sea pods to allow for the control of sub-sea hydraulic functions on the sub-sea blue and yellow pods; and a riser fill valve hose reel assembly may pay out and retrieve a hose that, in response to a sudden pressure differential between the inside and outside of a riser, opens to allow the riser to fill with seawater and thus equalizing the pressure differential and preventing collapse of the riser.

In operation, the spools are typically located on the drillship near a moon pool area (i.e. the opening in the floor or base of the platform to provide access to the water below) and may be on different levels depending on the rig design. The cable or hose often is deployed from the spool to an overhead roller type turn down sheave, or multiple sheaves, to direct the cable or hose to the blue and yellow pods on the BOP stack assembly in the drill ship's moon pool.

Typical systems employ manual, pneumatically-controlled, mechanical control systems for each of the individual reel assemblies, to position the sub-sea end of the cable or hose to the pod. Once the cables and hoses are connected to the pods, the operation of deploying the BOP stack begins. Drill pipe and flotation risers having typical lengths of 60 to 90 feet or more (nominally, about 18 to 28 meters) are attached to the stack. The cables and hoses are attached to clamps located on the riser as the 60 or 90 foot (nominally, about 18 to 28 meters) sections are made up. The reels are not rotating while the drill pipe and riser sections are made up. Once made up, the reels begin rotating to deploy the cables and hoses until the next section is ready to be attached. This operation continues until the BOP stack is anchored to the sea bed floor. A control stand may be located away from the spools, in the moon pool area, with a clear vision of the deployment. The operator at the remote control stand may be able to operate one or more of the reel assemblies and may make adjustments as may be necessary during the operation.

Currently, the pneumatically driven mechanical control systems used to control the reel assembly operation suffer from various shortcomings. For example, there are limitations on the locations of reel assemblies and a remote control stand because pneumatic control signals are subject to decreasing performance such as slower responses as the distance between the reel and the remote control stand increases. As another example, mechanical push-pull valves are used to alternate control between a local controller and a remote control stand. The use of these valves necessitate that an operator manually activate the valve at each reel assembly to provide full control of the system to the remote control stand. In addition, current reel assemblies do not provide much feedback to the operator about the actual conditions of the cable/hose, such as accurate, measured information about the actual tension on the cable/hose or how much of the cable/hose has been deployed. Current reel assemblies also do not use this type of measured information to control the operation of the system.

Small cable and wire spooling devices, such as Warn® winches found on cars, trucks, and small industrial equipment, may use electric control systems and electric motors to control the system. These electric control systems also suffer from various shortcomings, particularly for large scale applications. For example, a large electric motor demanding high electrical power may be needed. Due to this, the motor can be difficult to control by an operator and difficult to keep cool. Furthermore, manual controls, such as joysticks, only allow for simple functions based entirely on input from an operator.

Recently, Congress and Executive Agencies have enacted new laws and promulgated new regulations regarding offshore subsea oil drilling, in part a response to a number of oil spills throughout the early $21^{st}$ century. Some of these new laws and regulations require offshore oil drill operators to maintain records of various parameters and collected data during drilling to increase safety and create accountability in the event of an accident. Furthermore, this data may be able to help government and private investigations to determine the cause of accidents and/or prevent them from occurring in the future.

Finally, current systems attempt to estimate the amount of the deployed cable and/or tension on a given line for cables deployed with the BOP stack. These estimations are unreliable and do not necessarily reflect the actual tension or length that may be present for a given line. Mistakes can be made because operators are making decisions based on imprecise information.

Accordingly, a need has long existed for improved systems and methods for controlling cable spooling systems.

SUMMARY

In certain aspects, an electronic control unit may, based on received sensor data, automatically direct the operation of a reel assembly for deploying a cable, hose or umbilical connection. The electronic control unit may operate in conjunction with an electro-pneumatic drive to control the reel assembly. Sensors may measure various parameters, such as a measured line tension and/or a length of cable, hose or umbilical connection that has been deployed, and transmit the measured data to the electronic control unit. Optionally, the sensor data and/or user control inputs and system status information may be logged. The system also may use this data to control the system, such as by activating an alarm when a certain alarm limit is exceeded by the data, adjusting the pressure or other parameters of the electro-pneumatic drive, and the like. The system also may generate a visual notification for an operator when an alarm is triggered.

In one aspect, a reel assembly for accepting, holding, and deploying cable, hose, umbilical connections or the like, may include a spool assembly including a frame and a drum mounted in said frame. The drum may include a core and end flanges for storing said cable, hose or umbilical connection. The reel assembly may also include an air motor and an electro-pneumatic drive unit including a plurality of pneumatic valves, electro-pneumatic valves, or both, and the air motor may be coupled to the drum via the electro-pneumatic drive unit. The reel assembly may also include an electronic control unit coupled to the electro-pneumatic drive unit. The electronic control unit may receive user input and may transmit electrical signals to the electro-pneumatic drive unit to cause the electro-pneumatic drive unit to control the motor to rotate the drum. The electronic control unit may also receive input and may transmit electrical signals to the electro-pneumatic drive unit to cause the electro-pneumatic drive unit to increase or decrease an air pressure associated with the assembly.

In another aspect, a reel assembly for accepting, holding, and deploying cable, hose, umbilical connections or the like, may include a spool assembly including a frame and a drum mounted in said frame, and the drum may include a core and end flanges for storing said cable, hose or umbilical connection. The reel assembly may also include an air motor and an electro-pneumatic drive unit including a plurality of pneumatic valves, electro-pneumatic valves, or both, and the air motor may be coupled to the drum via the electro-pneumatic drive unit. The reel assembly may also include a local electronic control unit coupled to the electro-pneumatic drive unit, and the local electronic control unit may receive user input and may transmit electrical signals to the electro-pneumatic drive unit to cause the electro-pneumatic drive unit to control the motor to rotate the drum. The local electronic control unit may also receive input and may transmit electrical signals to the electro-pneumatic drive unit to cause the electro-pneumatic drive unit to increase or decrease an air pressure associated with the assembly. The reel assembly may also include a remote electronic control unit coupled to the electro-pneumatic drive unit, and the remote electronic control unit may receive user input and may transmit electrical signals to the electro-pneumatic drive unit to cause the electro-pneumatic drive unit to control the motor to rotate the drum. The remote electronic control unit may also receive input and may transmit electrical signals to the electro-pneumatic drive unit to cause the electro-pneumatic drive unit to increase or decrease an air pressure associated with the assembly.

In yet another aspect, a system for deploying a blowout prevention (BOP) stack may include a plurality of reel assemblies for accepting, holding, and deploying cable, hose, umbilical connections or the like. Each reel assembly may include a spool assembly including a frame and a drum mounted in said frame, and the drum may include a core and end flanges for storing said cable, hose or umbilical connection. Each reel assembly may also include an air motor and an electro-pneumatic drive unit including a plurality of pneumatic valves, electro-pneumatic valves, or both, and the air motor may be coupled to the drum via the electro-pneumatic drive unit. Each reel assembly may also include a local electronic control unit coupled to the electro-pneumatic drive unit, and the local electronic control unit may receive user input and may transmit electrical signals to the electro-pneumatic drive unit to cause the electro-pneumatic drive unit to control the motor to rotate the drum. The system may also include a remote electronic control unit coupled to the electro-pneumatic drive unit of each of the plurality of reel assemblies, and the remote electronic control may provide user interface controls for controlling each of the plurality of reel assemblies, may receive user input for controlling a selected reel assembly and, in response, may transmit electrical signals to the electro-pneumatic drive units of the selected reel assembly to cause the electro-pneumatic drive unit of the selected reel assembly to control the motor of the selected reel assembly to rotate the drum of the selected reel assembly.

In another aspect, a reel assembly may include a local electronic control unit and a remote electronic control unit. Selection of a user interface control on the remote electronic control unit may cause the local electronic control unit to display indicia indicative of at least one selected from the group of the user's selection on the remote electronic control unit user interface control and a current mode of operation.

In still another aspect, a reel assembly may include a local electronic control unit and a remote electronic control unit. Selection of a user interface control on the local electronic control unit may cause the remote electronic control unit to display indicia indicative of at least one selected from the group of the user's selection on the local electronic control unit user interface control and a current mode of operation.

In other various aspects, a reel assembly may include a sheave coupled to one or more sensors that determine either a force applied to the sheave, a length of cable, hose or umbilical connection deployed, or both. The sensors may be, for example, a load cell or a position sensor. The sheave may be coupled to an electronic control unit of the reel assembly, and the electronic control unit may receive information indicative of either the determined force, the length of cable, hose or umbilical connection deployed, or both. The electronic control also may display either a line tension value, a deployed cable value, or both, based on the received information.

In other various aspects, a reel assembly may include a plurality of user accounts having associated control permissions.

In other various aspects, a reel assembly may store a log of user inputs and information received from various sensors.

In yet another aspect, a reel assembly may include a user interface for setting an alarm value which may notify a user when the value is exceeded.

In another aspect, a reel assembly may provide for the automatic control of the reel by measuring system parameter(s), such as the tension of the cable, hose or umbilical connection, and automatically adjusting the behavior of the system based on the measured parameter(s).

In other aspects, a retrofit kit for a pneumatically controlled hose reel assembly may include an electronic remote control unit for controlling one or more reel assemblies, one or more local control units for controlling one or more reel assemblies, one or more sets of electro-pneumatic valves for operatively coupling the pneumatic drive unit of the reel assembly to either the local or remote control unit of one reel assembly, and a sheave comprising a load cell and rotary encoder for redirecting the direction of laid cable, hose, or umbilical connection and for measuring the line tension and deployed length of cable, hose, or umbilical connection, wherein the sheave is operably coupled to the local control unit, remote control unit, or both to transmit the measured line tension and deployed length.

Other systems, methods, features and technical advantages of the invention will be, or will become apparent to one with skill in the art, upon examination of the figures and detailed description. It is intended that all such additional systems, methods, features and technical advantages be included within this summary and be protected by the claims.

BRIEF DESCRIPTION OF THE DRAWINGS

The invention can be better understood with reference to the following drawings and description. The components in the figures are not necessarily to scale, emphasis instead being placed upon illustrating the principles of the invention.

Figures 18, 19:
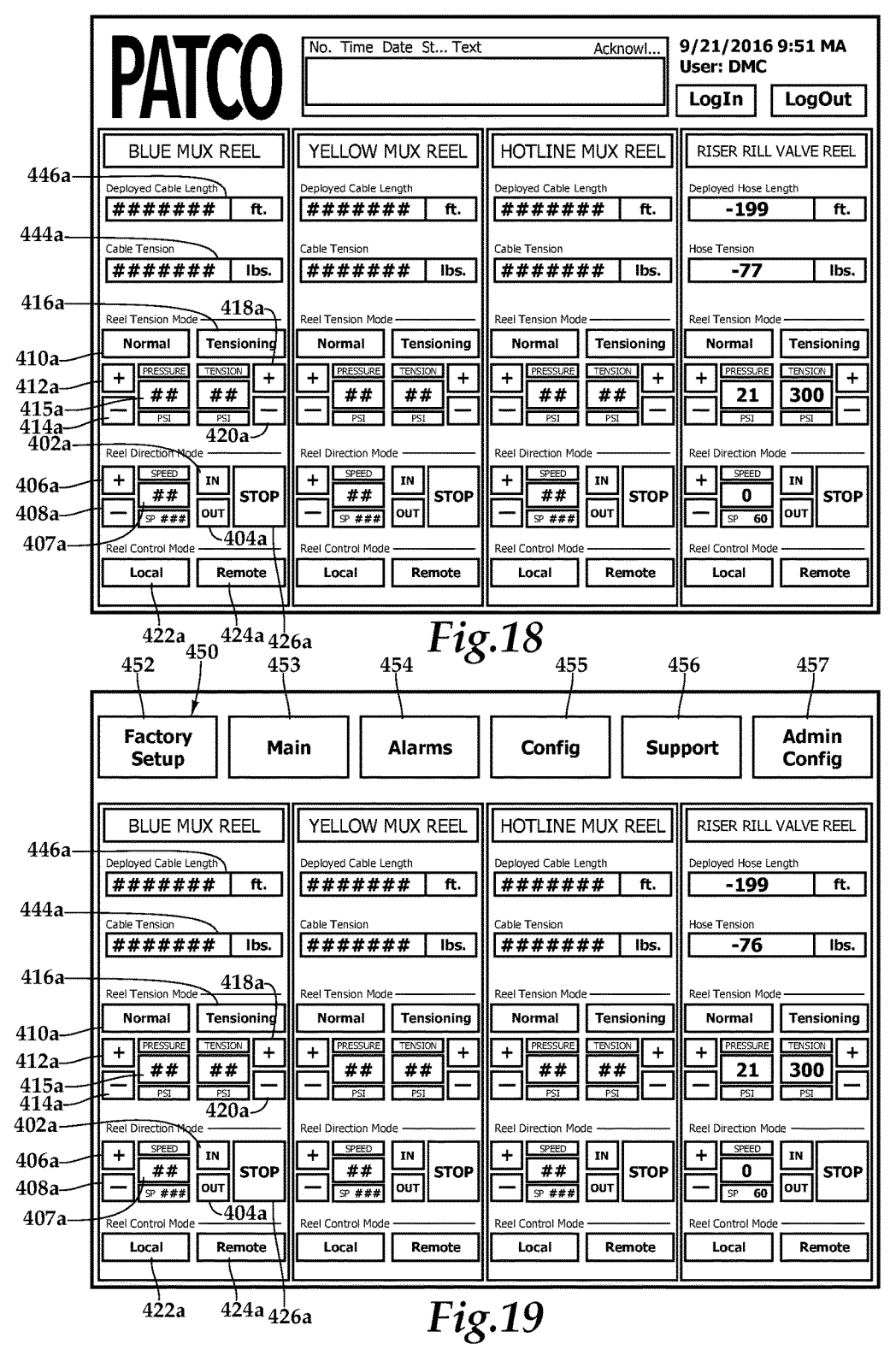

FIG. 18 shows another image of an exemplary control screen for another embodiment of remote control unit for use with the cable/hose reel assembly shown in FIG. 2.

FIG. 19 shows an image of an exemplary administrator control screen of a remote control unit for use with the cable/hose reel assembly shown in FIG. 2.

DETAILED DESCRIPTION OF THE PREFERRED EMBODIMENTS

The elements illustrated in the figures interoperate as explained in more detail below. Before setting forth the detailed explanation, however, it is noted that all of the discussion below, regardless of the particular implementation being described, is exemplary in nature, rather than limiting.

1.0 System Overview

Figure 1A:
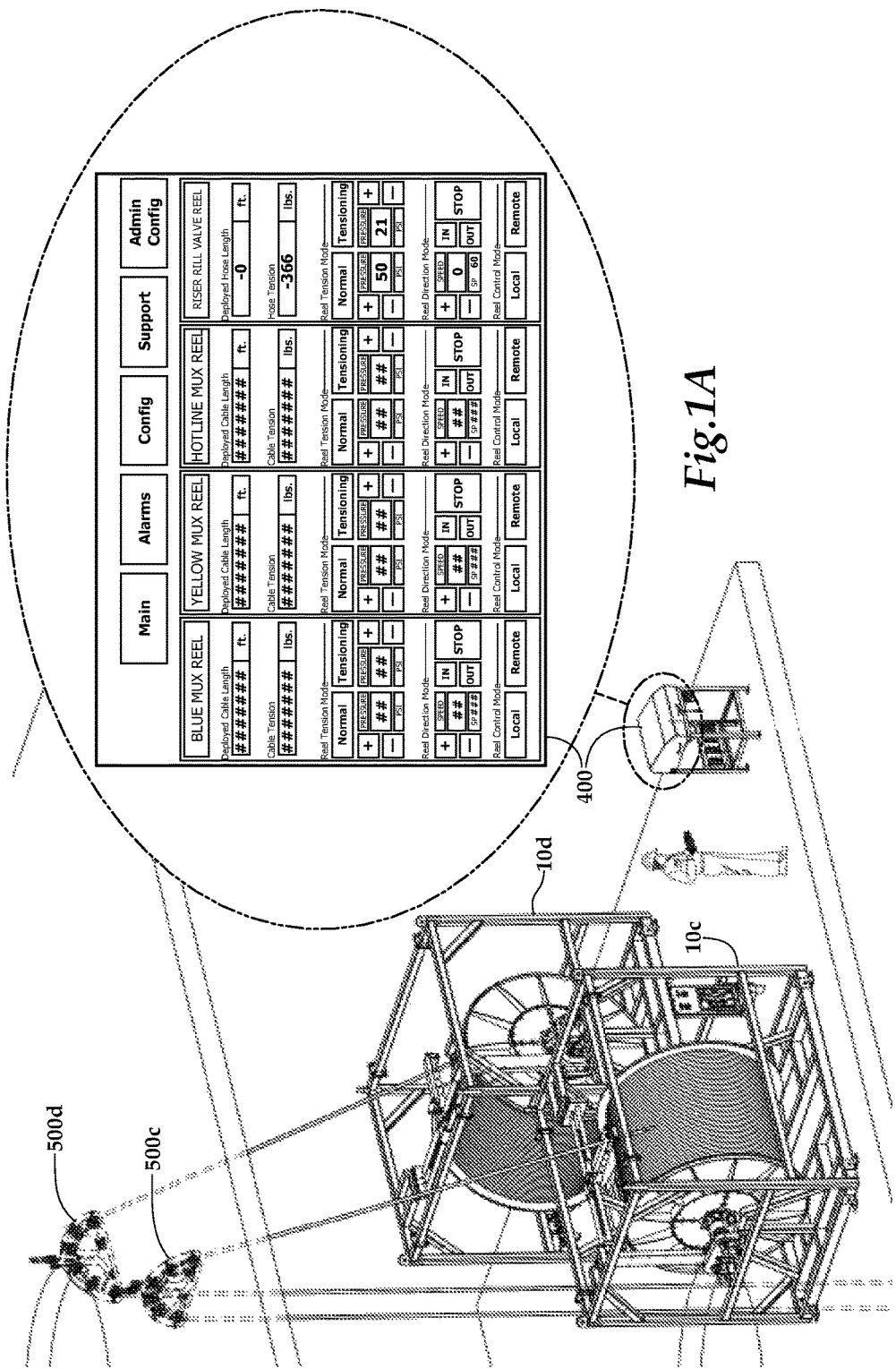
FIGS. 1a-b show exemplary configurations of reel assemblies having electronic control systems on a drilling rig.
Figure 1B:
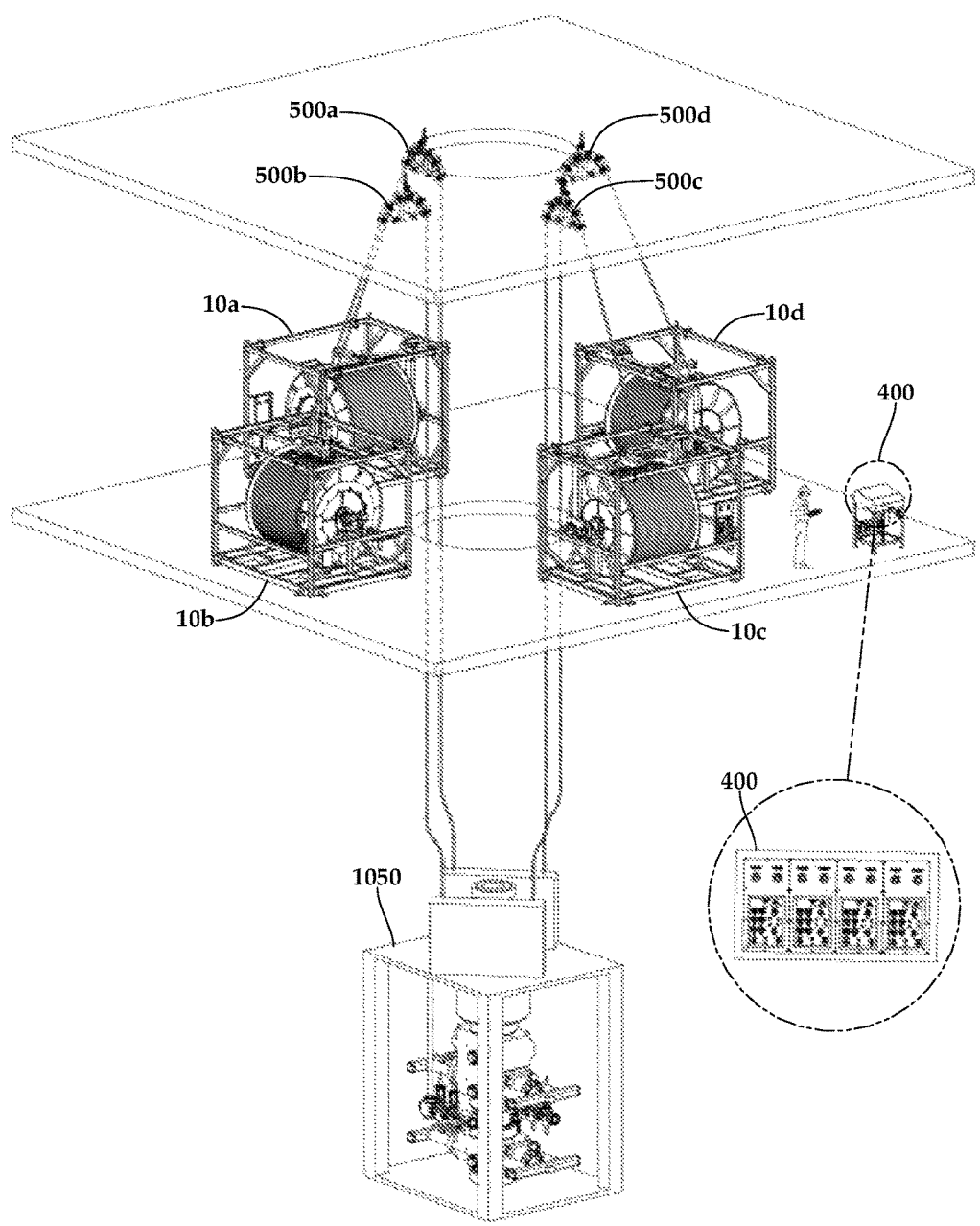

Referring to FIGS. 1a-b, exemplary configurations of cable/hose reel assemblies 10a-d are shown. Although the terms "cable," "hose," "umbilical," and "cable/hose" are used to describe various aspects of the embodiments described herein, it should be understood by one of ordinary skill in the art that the embodiments may be used in combination with cables, hoses, umbilical connections and the like and that use of the terms is exemplary in nature and not limiting. As illustrated, the configuration includes four reel assemblies 10a-d operating in conjunction with associated turn-down sheaves 500a-d to provide various cables, hoses and the like to a BOP stack 1050. Each reel assembly 10a-d may include an electronic local control unit 300 (FIG. 2) and may also be connected to an electronic remote control unit 400.

Figure 2:
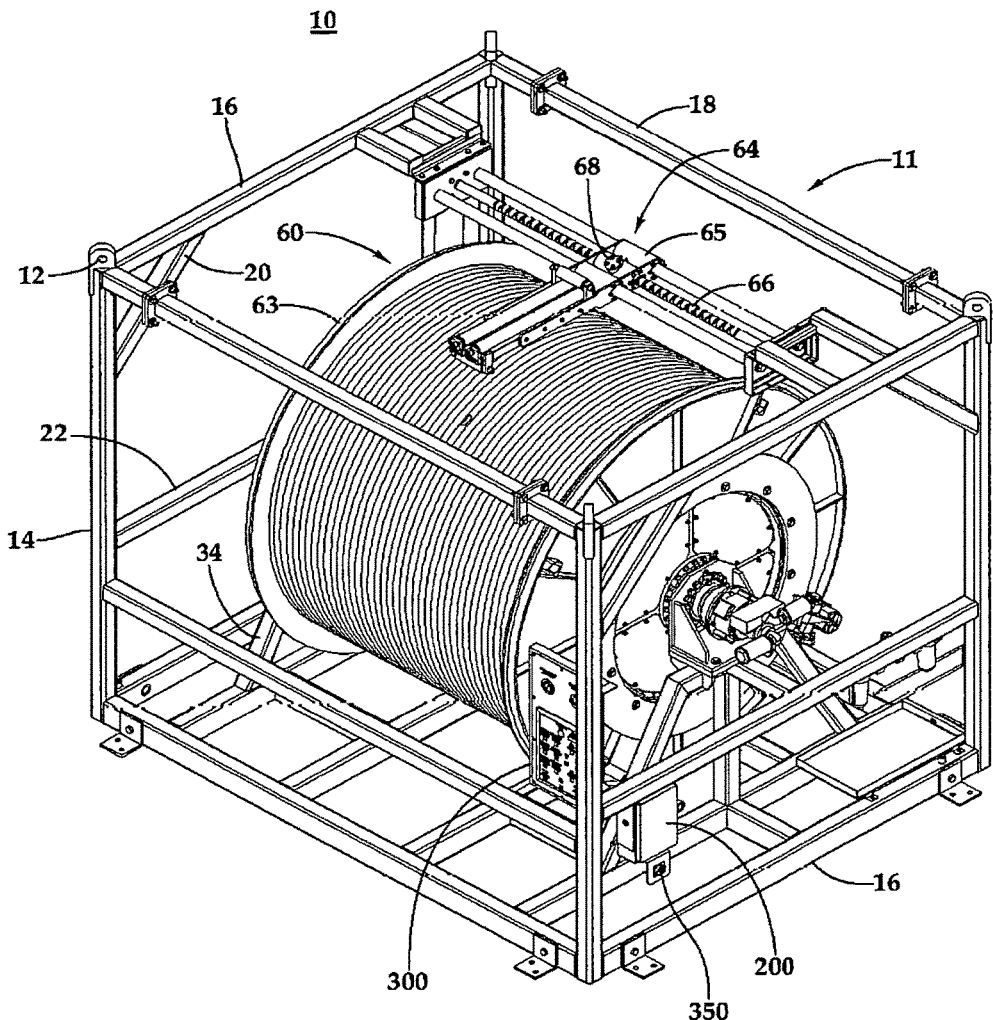
FIG. 2 shows a perspective view of an exemplary cable/hose reel assembly having an electronic control.
Figure 3:
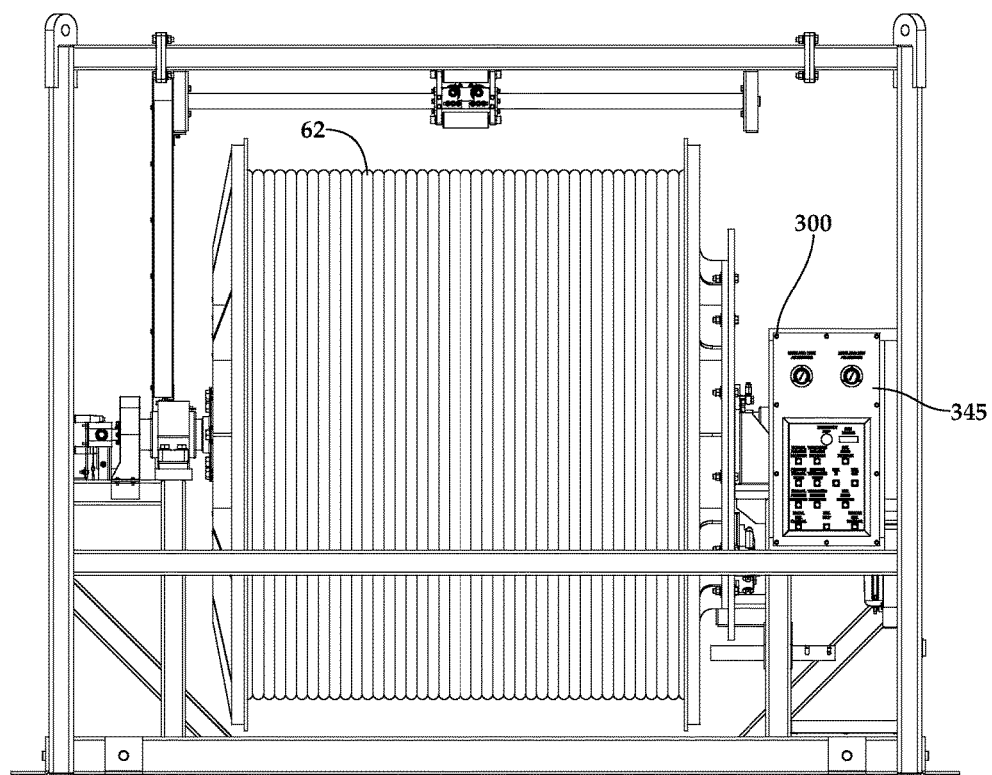
FIG. 3 shows a front view of the cable/hose reel assembly of FIG. 2.
Figure 4:
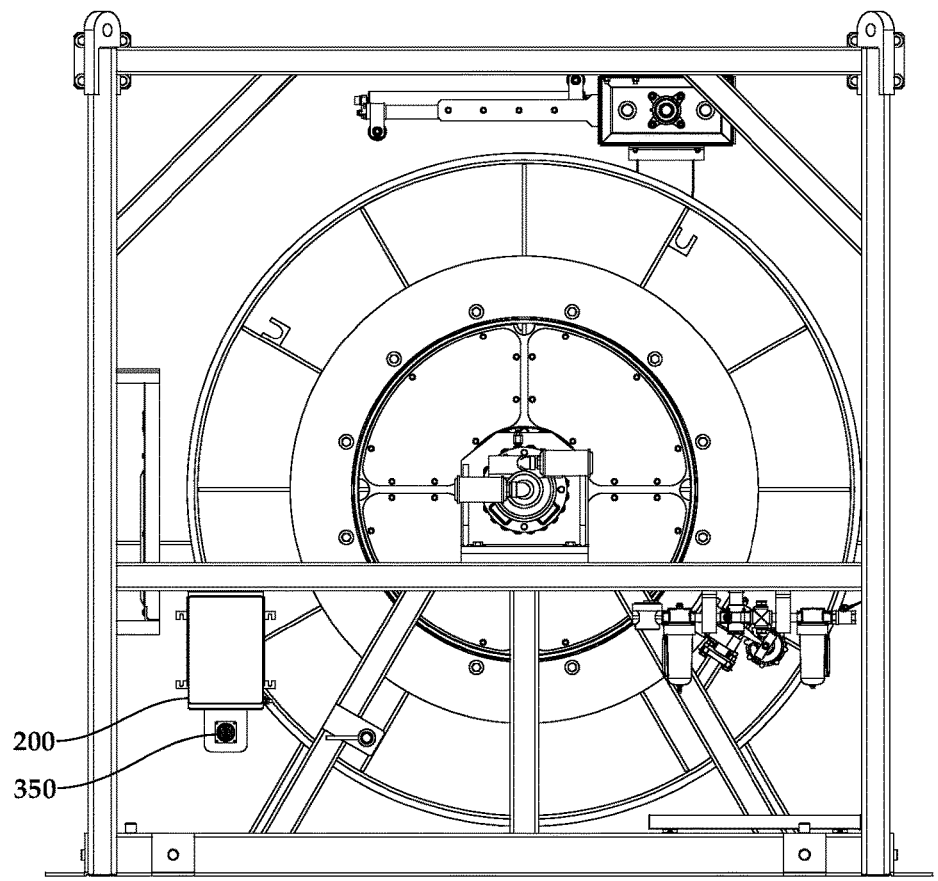
FIG. 4 shows a right side view of the cable reel assembly of FIG. 2.

The cable/hose reel assembly 10 is shown generally in FIGS. 2-4, and may comprise a spool assembly 11 powered by an electro-pneumatic drive system 200 operated via an electronic control unit 300. In some embodiments, the assembly 10 may include a plurality of electronic control units 300, such as one or more local control units housed on the reel assembly 10 and one or more remote control units that may be physically separate from the reel assembly 10.

1.1 Exemplary Reel Assemblies 10

The reel assembly 10 may comprise a frame 12 that rotatably supports a cable spool 60 via drum supporting members 34, the spool 60 having a core or hub 62 and opposite end flanges 63. A cable, wire, hose, etc. is guided onto and off of the spool for even wrapping by means of a guide or "level wind" assembly 64 having a carriage 65 mounted for traversing a reversible diamond groove shaft 66 by means of a follower 68, as the shaft 66 is rotated. In some embodiments, the "level wind" assembly 64 may operate like one or more of the ones described in U.S. Pat. Nos. 7,210,647 and 8,061,644, each of which is incorporated by reference as if fully restated herein. Other "level wind" assemblies may be used.

Spool 60 may have a diameter between about 30 inches (nominally, about 75 centimeters) and about 120 inches (nominally, about 30 centimeters) or more, preferably between about 48 inches (nominally, about 120 centimeters) and about 72 inches (nominally, about 185 centimeters), and may have a width between about 50 inches (nominally, about 125 centimeters) and about 150 inches, and preferably between about 72 inches and about 120 inches (nominally, about 300 centimeters). The flanges 63 may have a diameter between about 48 inches (nominally, about 120 centimeters) and about 205 inches (nominally, about 525 centimeters), preferably between about 60 (nominally, about 150 centimeters) inches and about 180 inches (nominally, about 460 centimeters). The cable/hose may have a length between about 4,000 feet (nominally, about 1,200 meters) and about 20,000 feet (nominally, about 6,100 meters), preferably between about 7,000 feet (nominally, about 2,100 meters) and about 15,000 feet (nominally, about 4,600 meters) and even more preferably between about 11,000 feet (nominally, about 3,300 meters) and about 13,000 feet (nominally, about 4,000 meters). An exemplary cable may have a diameter between about ½ of an inch (nominally, about 1.2 centimeters) and about 2½ inches (nominally, about 6 centimeters), and typically about between about 1¼ inches (nominally, about 3.5 centimeters) and about 1¾ (nominally, about 4.5 centimeters). An exemplary hose may have a diameter between about 1½ inches (nominally, about 3.8 centimeters) and about 2½ inches (nominally, about 6 centimeters), and an exemplary umbilical connection may have a diameter between about 4 inches (nominally, about 10 centimeters) and about 8 inches (nominally, about 20 centimeters). Other sizes may also be used.

1.2 Exemplary Reel Assembly Frames 12

Frame 12 may include a plurality of vertical end frame members 14, horizontal end frame members 16, and cross members 18. Frame 12 also may include a plurality of corner braces 20, such as braces 20 connecting vertical end members 14 to horizontal end members 16 or to cross members 18.

Frame 12 further may include one or more intermediate, horizontal braces 22, preferably a plurality of braces 22, around a perimeter of frame 12. Horizontal braces 22 may be located proximate a height of the center/axis of rotation of spool 60, preferably slightly below center of spool 60.

2.0 Exemplary Local Control Systems 300

The electronic control system 300 may receive input from an operator to control various aspects of the operation of the reel 11. In some embodiments, the electronic control system 300 may include a programmable logic controller (PLC) coupled to a touchscreen for displaying various interface controls, receiving user input and displaying status information to an operator. The PLC may be programmed to provide electrical signals to the electro-pneumatic drive unit 200 to control the operation of the reel assembly as described below. Other electronic input devices, such as keyboards, keypads, and the like may be used. Similarly, other components may be used to process the received inputs and provide control signals to the electro-pneumatic drive unit 200, such as a stand-alone computer, and/or to display status information to the operator, such as displays, LEDs and the like. In some embodiments, the control unit 300 may include a proportional-integral-derivative controller (PID controller or three term controller) 345 that receives and/or processes input from a load cell 502 of a turn down sheave 500, as described below. The electronic control system 300 may be local control system that is fixedly and/or removably attached to the frame 12.

2.1 Exemplary User Accounts

Figure 14A:
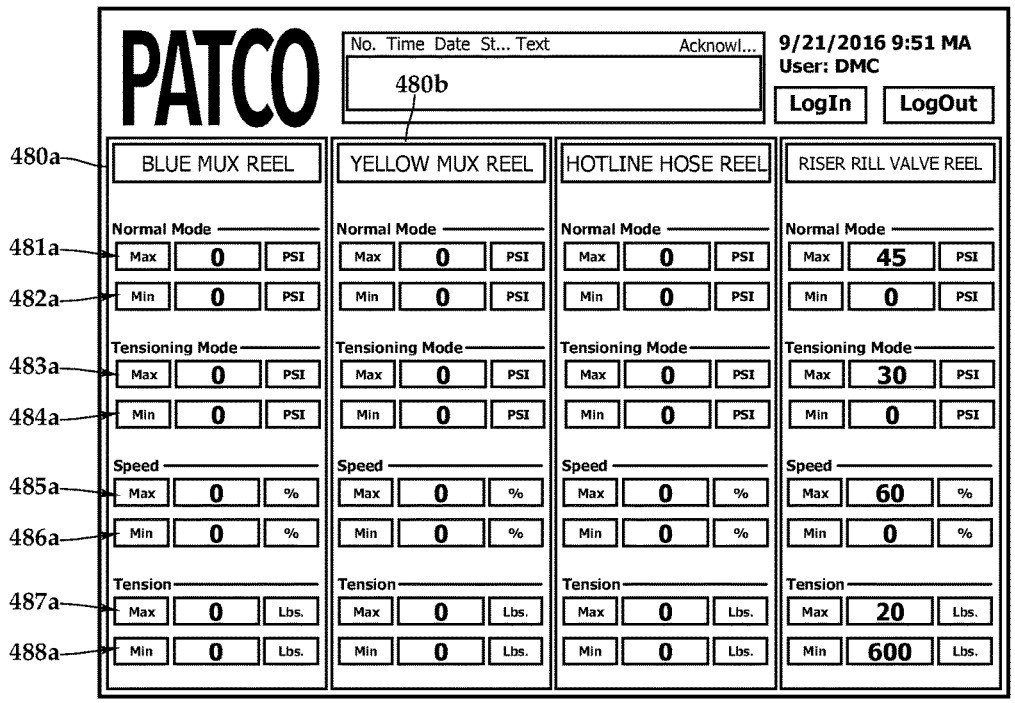
FIGS. 14a-b show images of exemplary configuration screens for remote and local control units for use with a cable/hose reel assembly shown in FIG. 2.
Figure 14B:
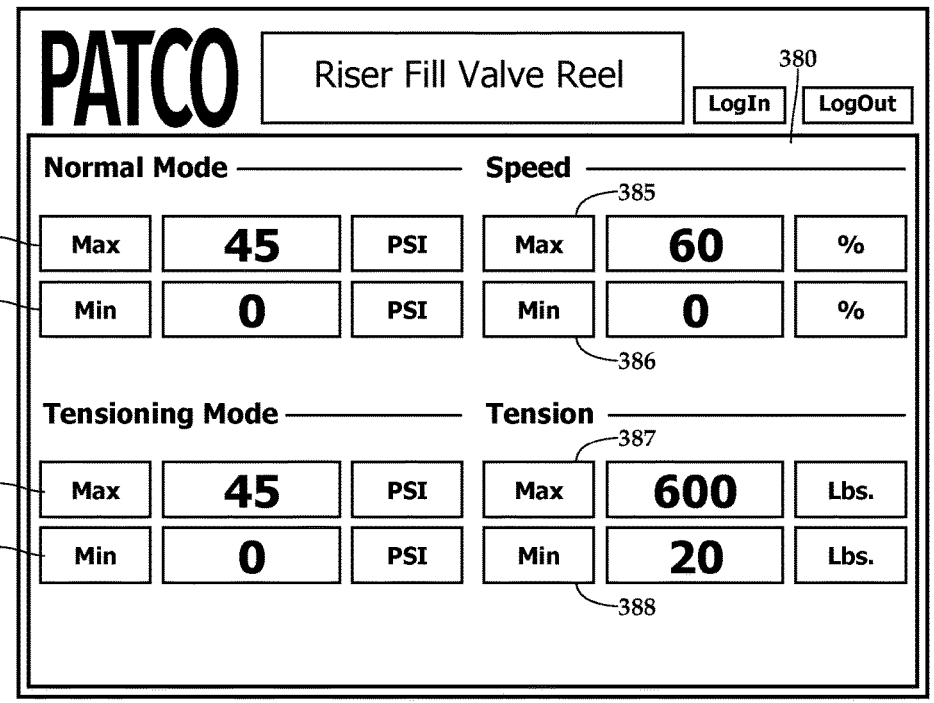
Figure 15A:
FIGS. 15a-b show images of exemplary support screen on the user interface for remote and local control units for use with a cable/hose reel assembly shown in FIG. 2.
Figure 15B:

System 100 may include an electronic control system 300 with one or more user accounts in the system. For example, as shown in the Figures, an administrative user may have access to all of the features of the system, such as reel control features (FIGS. 12*a-b*), system configuration settings (FIGS. 14*a-b*), alert/alarm settings (FIGS. 13*a-b*), calibration settings (FIG. 16), and the like. These features may be accessed through a touchscreen interface, such as the interfaces shown in FIGS. 12*a-b*. In the illustrated embodiment, reel control features may be accessed via local interface control 362 and/or remote interface control 452, alarms features reel control features may be accessed via local interface control 364 and/or remote interface control 453, configuration control features may be accessed via local interface control 366 and/or remote interface control 454, support information 389 (on local control 300 as shown in FIG. 15*b*) and 489 (on remote control 400 as shown in FIG. 15*a*) may be accessed via local interface control 368 and/or remote interface control 455, and administrative configuration control/factory setting features may be accessed via remote interface control 457

Figure 12A:
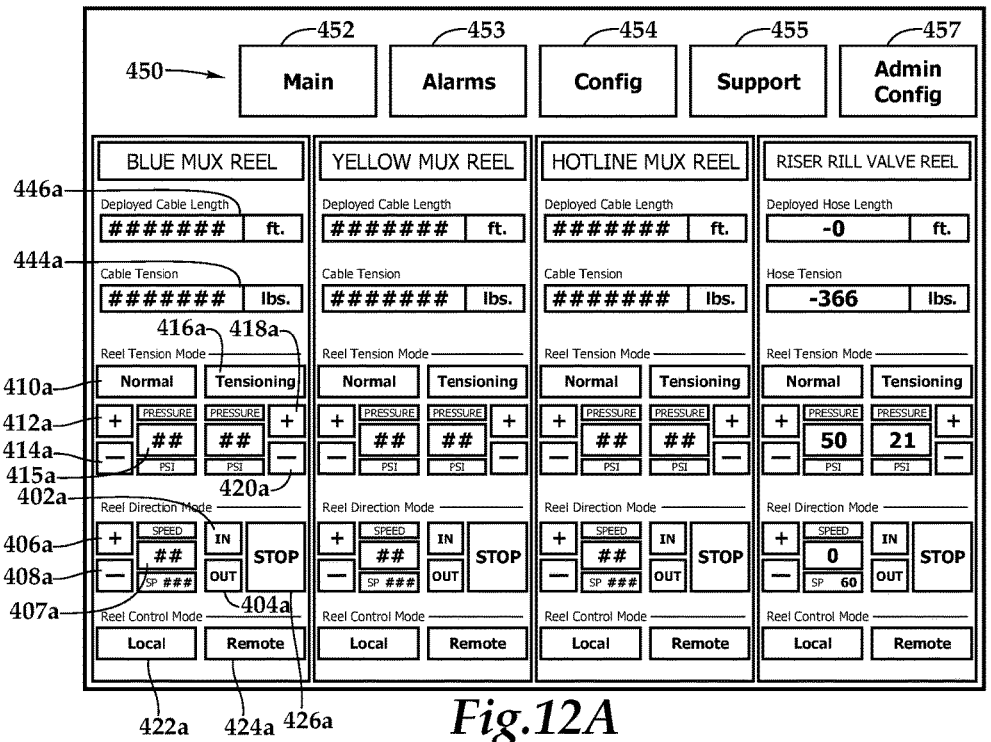
FIGS. 12a-b show images of exemplary reel control screens for a user interfaces for remote and local control units for use with a cable/hose reel assembly shown in FIG. 2.
Figure 12B:
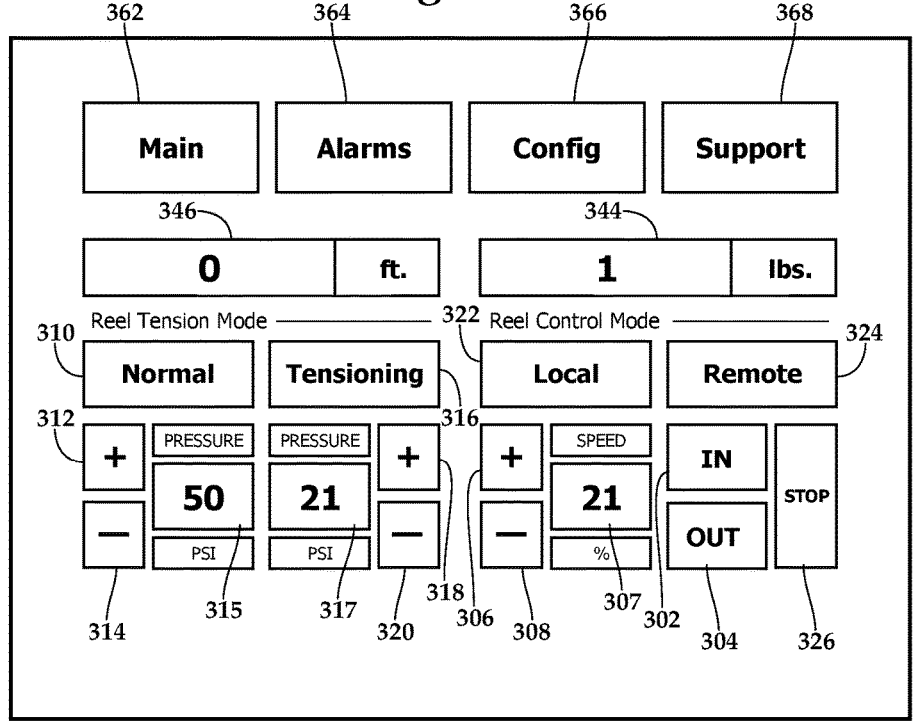

As another example, operator users may have access to limited features of the system, such as reel control features. Each user account may include its own user profile and permissions. User accounts may be protected by a password. In some embodiments, the system may require all users to log into their user account before accessing the local (as seen in FIG. 12*b*) or remote control unit 400 (as seen in FIG. 12*a*) using corresponding interface controls 303 and 305 to log in or out, respectively. Alternatively, or additionally, some aspects of the system may be accessible without a password, e.g., guest access. The system also may time out certain or all users after a pre-determined period of inactivity.

The electronic control system also may integrate with other control systems on a drilling rig, such as the driller's console or tool pusher panel. This may allow the reel assembly to be controlled by other users and/or from other parts of a drilling rig.

The system may include different types of users, such as administrative users, operator users, or operating group users. Other types of users also may be provided. An administrative user account may have privileges and access to features not available to other users. This may include permissions in the electronic control system 300 to set certain operational limits for various parameters of the system (FIGS. 14*a-b*). These parameters may include, among others, deployment speed (via controls 385 and 386 of the local control unit 300 and/or controls 485*a* and 486*a* of the remote control unit 400), cable tension (via controls 387 and 388 of the local control unit 300 and/or controls 487*a* and 488*a* of the remote control unit 400), and/or pneumatic pressure (via controls 381, 382, 383 and 384 of the local control unit 300 and/or controls 481*a*, 482*a*, 483*a* and 484*a* of the remote control unit 400). For example, a user with administrative privileges may set a certain upper and lower limit for the deployment speed control for a reel, thus limiting all users to those speeds, via interface controls 385 and 386 on the local control unit 300 and/or interface controls 485a and 486a of the remote control unit 400. In the embodiment illustrated in FIGS. 14a-b, the administrative user has set a minimum of 0 psi of pressure for both normal and tensioning mode and a maximum of 45 psi for normal mode and 30 psi for tensioning mode. Other values may also be used.

Figure 8:
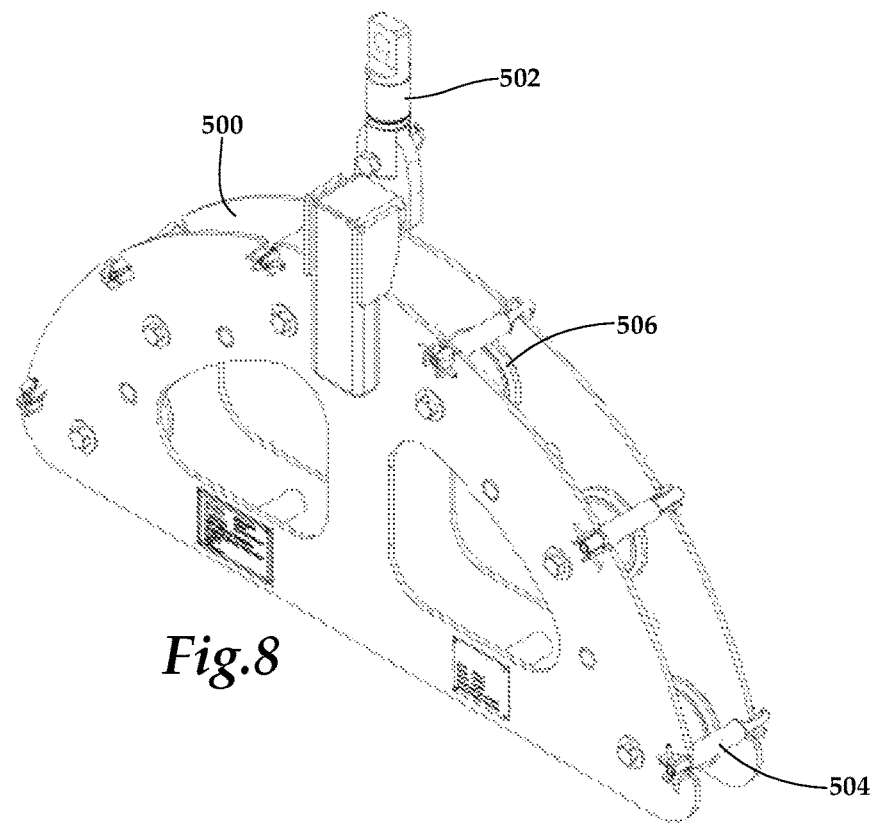
FIG. 8 shows an exemplary turn down sheave for use with a cable/hose reel assembly shown in FIG. 2.
Figure 9:
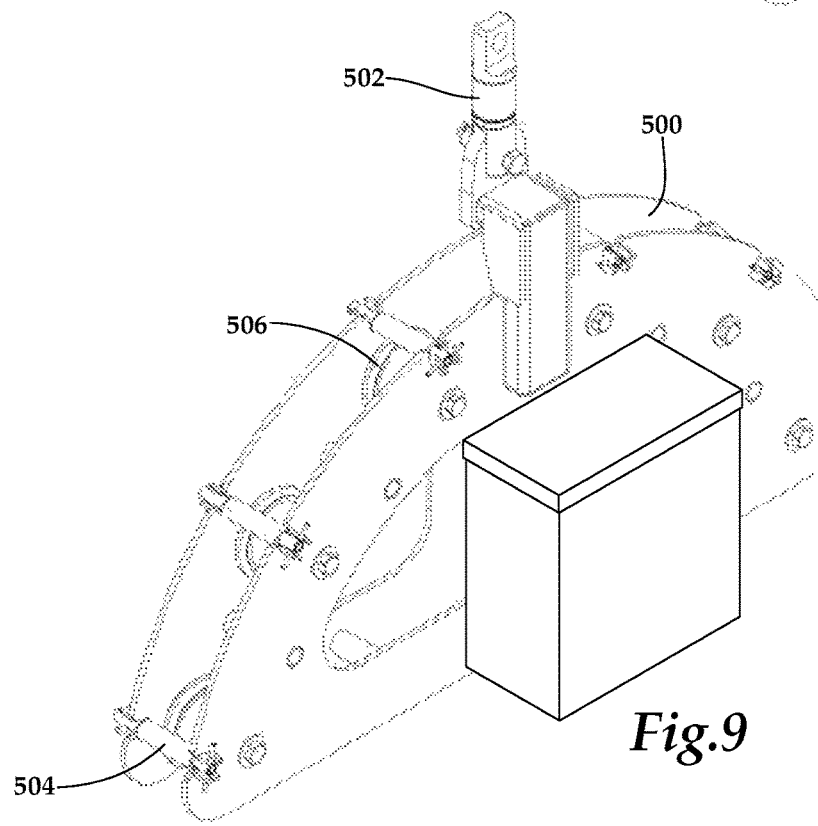
FIG. 9 shows another image of an exemplary turn down sheave for use with a cable/hose reel assembly shown in FIG. 2.
Figure 16:
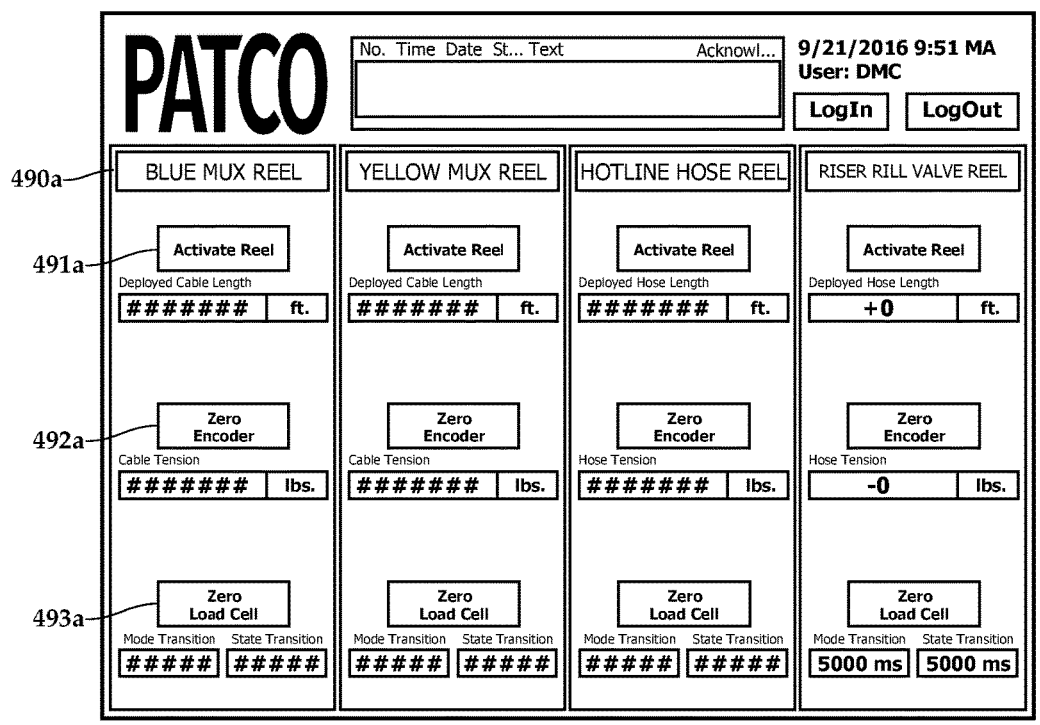
FIG. 16 shows an image of exemplary administrative configuration screens for a remote control unit for use with a cable/hose reel assembly shown in FIG. 2.
Figure 20:
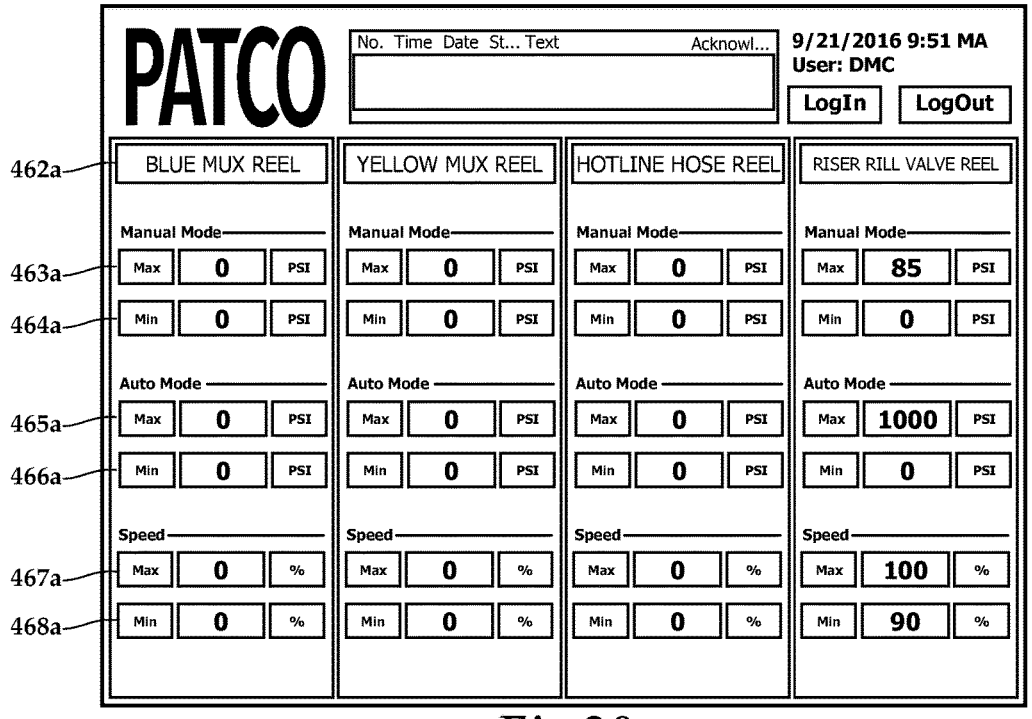
FIG. 20 shows an image of an exemplary factory/default settings screen of a remote control unit for use with the cable/hose reel assembly shown in FIG. 2.

Certain user accounts, such as an administrative user account, may have access to calibration features that allow the user to calibrate various aspects of the system. For example, as shown in FIG. 16, an administrative user may be able to calibrate the load cell and/or rotary encoder of the turn down sheave 500 (as shown in FIGS. 8 and 9) via interface control 494a and 492a, respectively. A user with proper permissions may zero-out a parameter at any time. For example, after deploying a cable to the seafloor, an administrative user may zero-out the deployment length to easily see any subsequent changes in deployment length. As shown in FIG. 20, the system may limit access to the administrative control screen to the remote control unit only. The administrator also may configure the system to activate select reels via control 491a and the system may only display the controls for those active reels. The system may show active reels and controls in a different color, such as green and may show inactive reels or controls another color, such as grey.

2.2 Exemplary Administrative Features

Figure 13A:
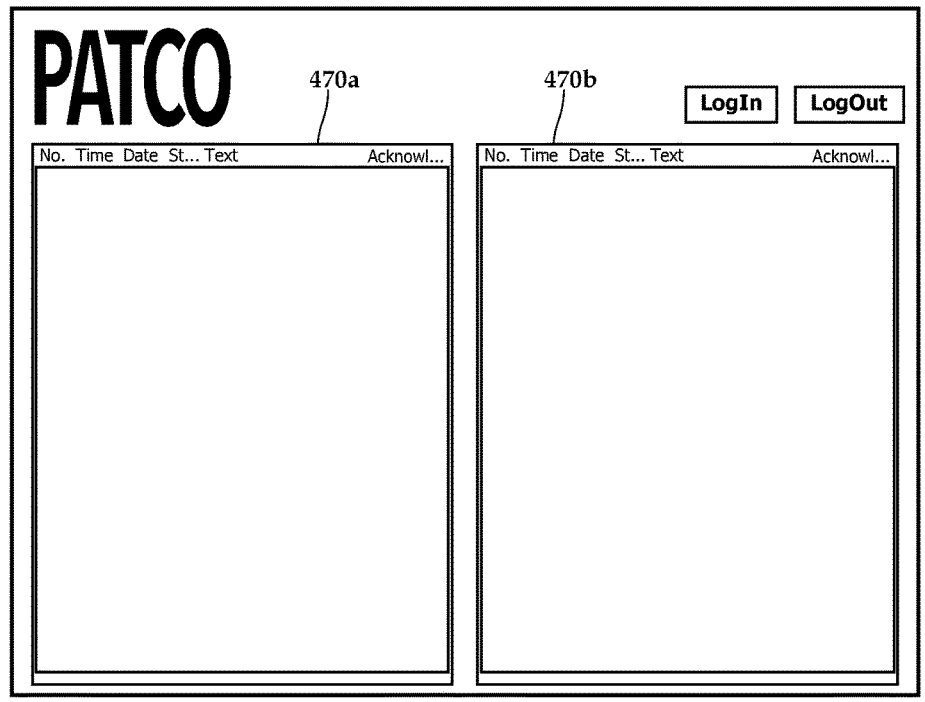
FIGS. 13a-b show images of exemplary alarm screens for the user interfaces for remote and local control units for use with a cable/hose reel assembly shown in FIG. 2.
Figure 13B:
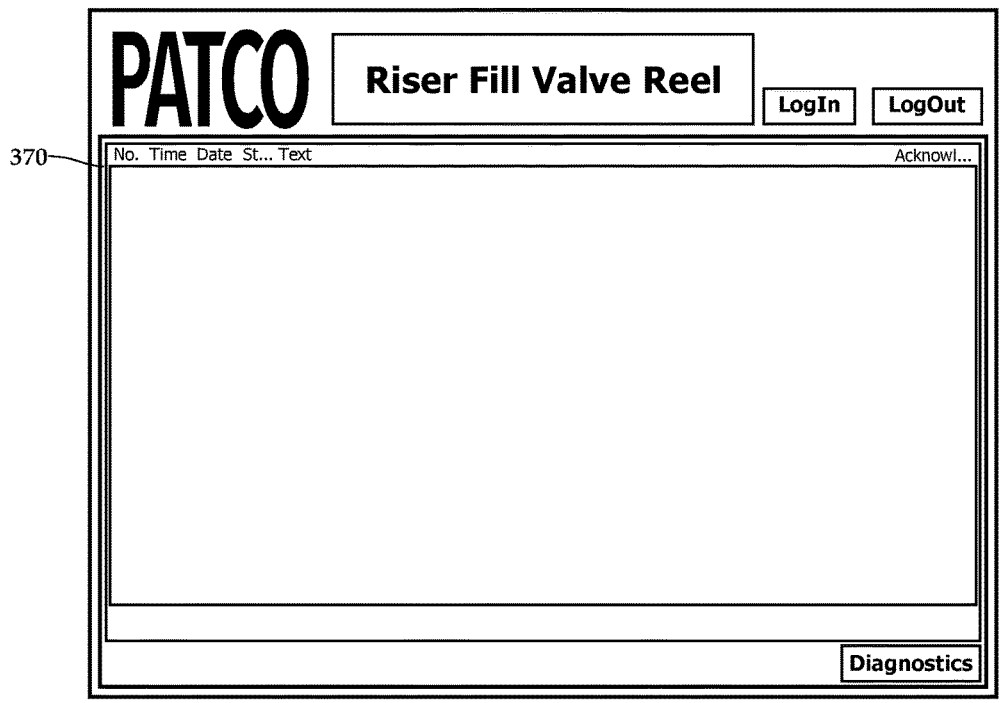

As seen in FIGS. 13a-b, administrative user accounts also may set alarm limits for various parameters. These parameters may include, among others, high cable tension, emergency stops, or control system alarms, such as for failed hardware or lost connections. These alarm limits may be high or low alarm limits. Upon reaching a set limit, the electronic control system 300 may indicate the limit to a user by visual alerts such as changing the color of the local or remote control unit screen, displaying a notification on a local or remote control unit screen, or flashing lights on a local or remote control unit screen operably coupled to the system. A user may clear an alarm notification on a control unit screen by acknowledging an on-screen prompt after the triggering event has been remedied. In some embodiments, the system may allow any user to clear alarm notifications. Alternatively, an administrative user may be required to clear an alert. Some alerts may clear automatically as soon as the fault is corrected, i.e. without user input into the electronic control system.

Exemplary alarms may include an input value out of range, an invalid input, an inability to maintain an oscillation value for the PID, a change for a set point, invalid input format, output calculation error, cycle interruptions, invalid set point format, invalid manual input format, invalid output value forma, local emergency stop button activation, remote emergency stop button activation, high tension fault, and the like. Other alarms also may be used.

In some embodiments, administrators may have access to a factory-settings or default option, as shown in FIG. 20. Similar to the operational settings above, the factory-settings may be include upper and/or lower limits for various parameters of the system, such as deployment speed (via controls 467a and 468a), cable tension, pneumatic pressure (via controls 463a, 464a, 465a and 466a), and the like. In some embodiments, the factory-settings may not be editable by an administrator.

2.3 Exemplary Operational Features for Local Control Unit 300

Figure 5:
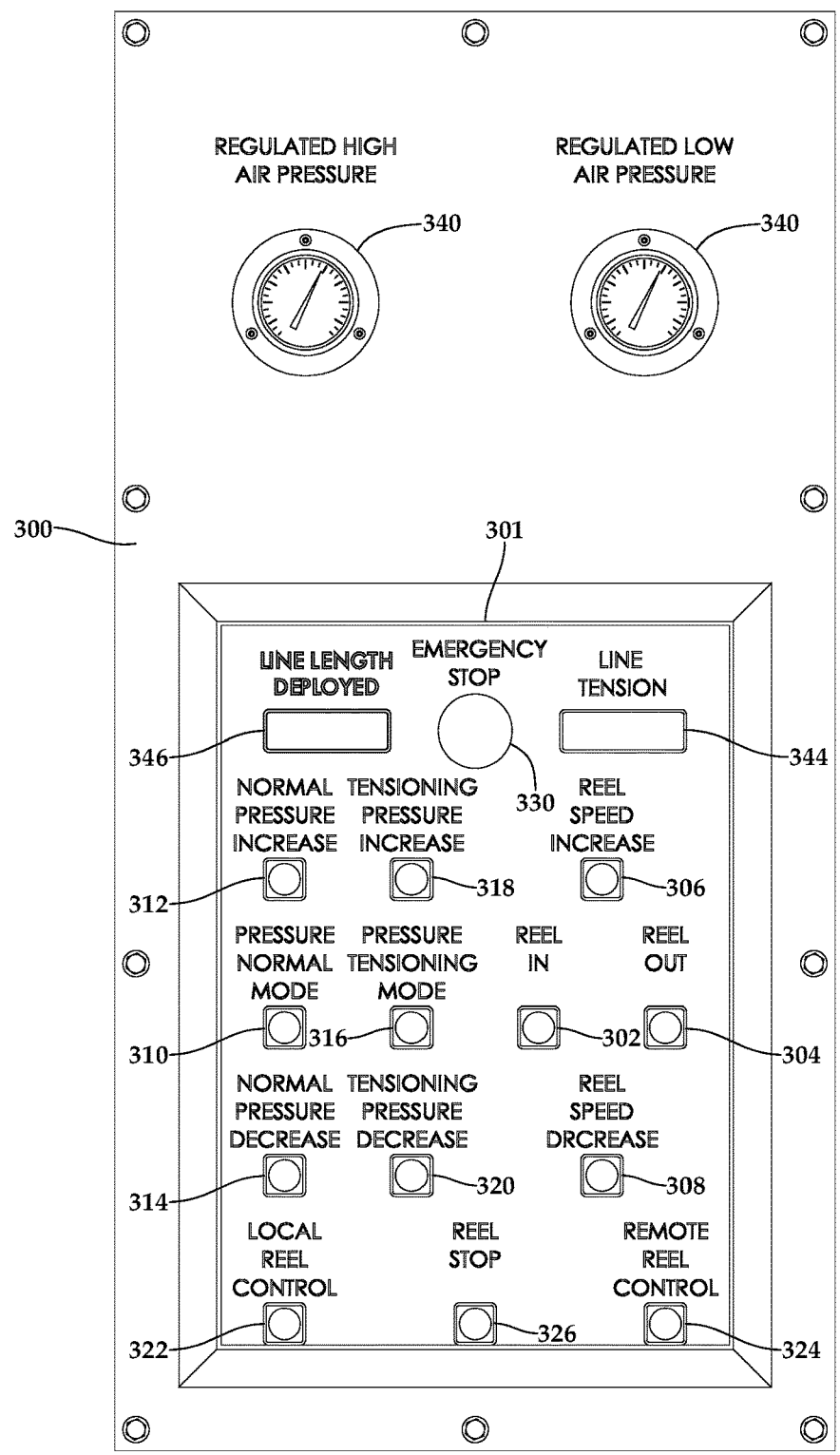
FIG. 5 shows an exemplary local control panel for the cable/hose reel assembly of FIG. 2.

Referring to FIG. 5, an exemplary local control unit 300 is shown. In the illustrated embodiment, the local control unit 300 includes a touchscreen device 301 for displaying various interface controls 302-330, receiving user input via the interface controls 302-330 and displaying status information to an operator. For example, the local control unit 300 may display a line tension value 344 and/or a length of cable deployed 346 that may be measured by sensors, such as a load cell or a position sensor, mounted in a turn down sheave that receives the cable mounted on the reel assembly 11, as described below. The local control unit 300 also may display indicia that indicates the selection of a user interface control 302-330. For example, upon selection of a "reel-in" control 302, the local control unit 300 may modify the color of the "reel-in" control 302 to indicate its selection by the user and/or to indicate that the reel is winding the cable, as described below. Alternatively, or additionally, other indicia, such as adding display items, removing displayed items, and the like, may be used to indicate the selection of a particular control 302-330.

Figure 11:
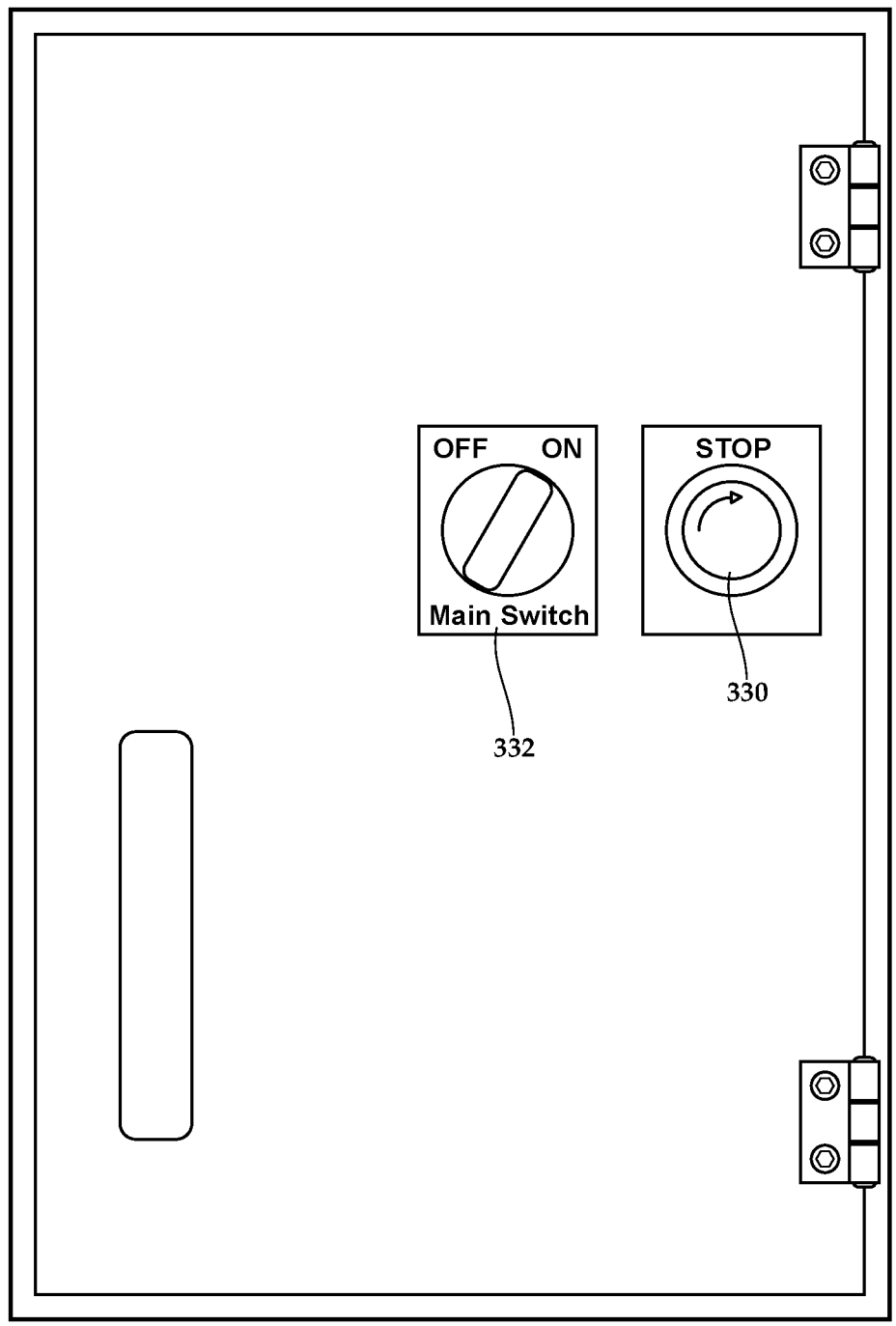
FIG. 11 shows an image of the back of an exemplary electro-pneumatic enclosure for use with a cable/hose reel assembly shown in FIG. 2.

In some embodiments, the local control unit 300 may also include pneumatic pressure gauges 340 and 342 that may indicate the various system pressure settings as shown in FIGS. 5 and 11. For example, a first pneumatic pressure gauge 340 may indicate the pneumatic pressure in a normal mode of operation and a second pneumatic pressure gage 342 may indicate the pneumatic pressure in a tensioning mode of operation, as described below.

Figure 6:
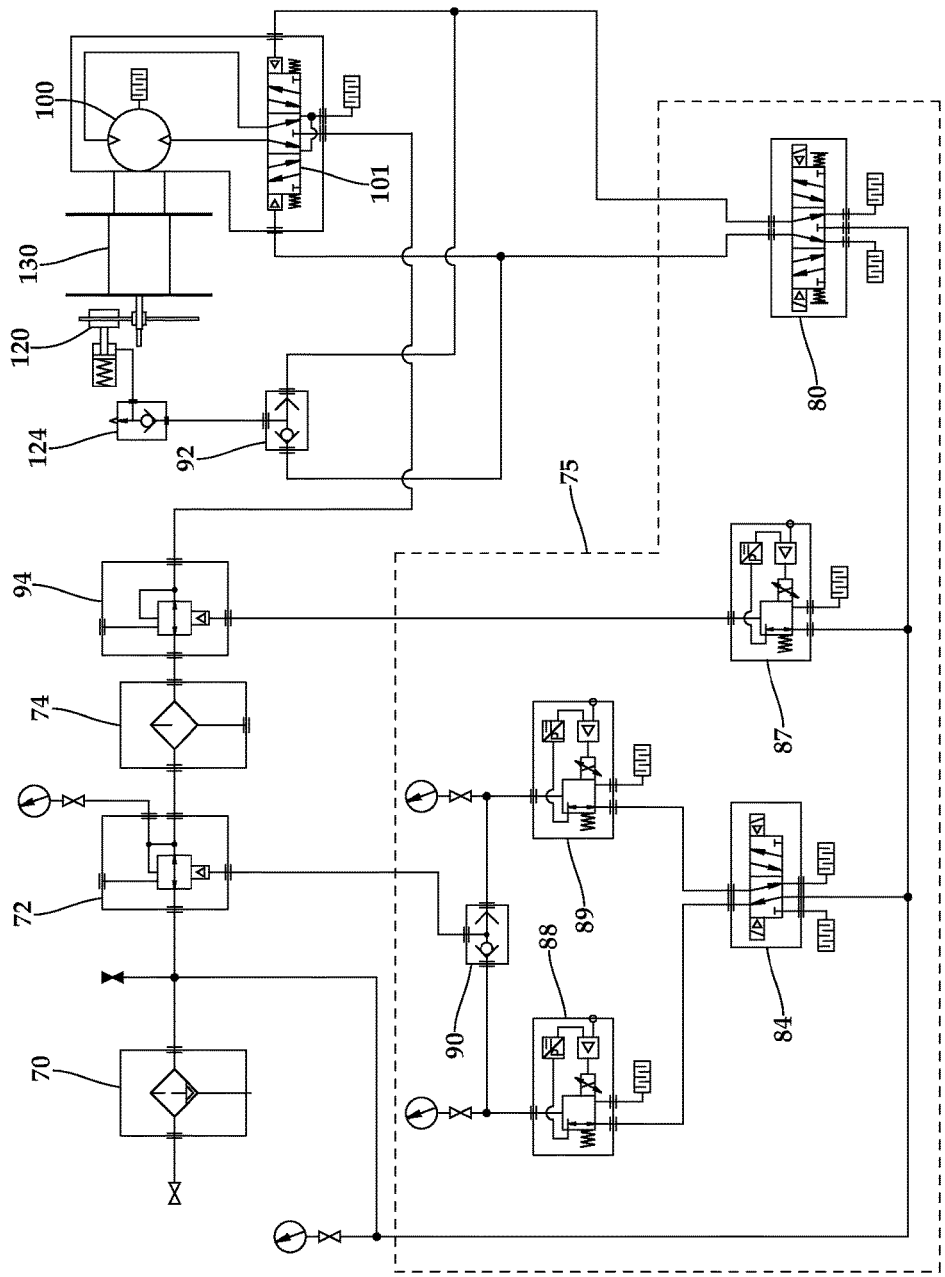
FIG. 6 shows a schematic diagram illustrating the operation of an exemplary electro-pneumatic drive system for use in an electronic control system for a cable/hose spooling system.

In one embodiment, the operation of the reel assembly 11 via the local control unit 300 may be as follows. To reel up a cable, an operator may select the "reel in" interface control 302, which activates the corresponding solenoid valve 80 which in turn causes the drive motor 100 to rotate (as shown in FIG. 6). The motor 100 can be reversed by selecting the "reel out" interface control 304, to reverse spool rotation for continuously and evenly feeding out cable. The speed at which the spool rotates may be adjusted by selecting the "reel speed increase" interface control 306 or "reel speed decrease" interface control 308 to increase or decrease the rotational speed of the spool, respectively. Selection of the "reel stop" interface control 326 may cause rotation of the spool to be halted. Selection of the "emergency stop" interface control 330 may cut-off power to the entire electro-pneumatic drive system 200, and selecting the "emergency stop" interface control again may reactivate the electro-pneumatic drive system 200. Alternatively, or additionally, one or more additional controls may be provided to reactivate the electro-pneumatic drive system 200. In some embodiments, previously established settings, such as a tension setting for a "normal" mode of operation and/or a "tensioning" mode of operation, may be saved when the "emergency stop" interface control 300 is activated. In other embodiments, one or more settings may be reset by depression of the "emergency stop" interface control 330.

2.3.1 Exemplary Operational Modes

Figures 17A, 17B:
FIGS. 17a-b show images of exemplary control screens for remote and local control units for use with a cable/hose reel assembly shown in FIG. 2.

An operator may switch between a "normal" mode of operation and a "tensioning" mode of operation by selecting the "normal pressure mode" interface control 310 or "pressure tensioning mode" interface control 316. In some embodiments, these modes may be referred to as the "manual" mode and "automatic" mode, respectively, as shown in FIGS. 17a-b. The operator may increase or decrease the amount of tension in each of these modes independently via interface controls 312 and 314 for the "normal" mode and interface controls 318 and 320 for the "tensioning" mode.

2.3.1.1 Exemplary Normal or Manual Operational Mode

The "normal" mode of operation may be used, for example, to spool a cable, hose or the like onto a reel during setup. In a "normal" mode of operation, a static pressure may be applied to the line, such as between about 10 pounds per square inch (PSI) (nominally, about 70 kiloPascals (kPa)) and about 145 PSI (nominally, about 1000 kPa), preferably between about 30 PSI (nominally, about 200 kPa) and about 110 PSI (nominally, about 760 kPa), more preferably between about 50 PSI (nominally, about 340 kPa) and about 90 PSI (nominally, about 620 kPa), and in one embodiment about 70-80 PSI (nominally, between about 480 kPa and about 550 kPa). The pressure may be selected to generate a predetermined cable/hose line tension for the reel assembly 10. In the "normal" mode of operation, selection of the "reel in" and/or "reel-out" controls 302 and 304 cause the assembly 10 to wind in or pay out the cable or hose.

2.3.1.2 Exemplary Tensioning or Automatic Operational Mode

In a "tensioning" mode of operation, the assembly 10 may maintain a substantially constant tension on the cable/hose, for example, to prevent the cable/hose from being tangled on any structure in the moon pool area as the drillship moves with wave motions. In one embodiment, an operator may activate a tensioning mode of operation as follows. First, the operator may select the "reel-in" interface control 302 and may set an appropriate speed with control 306 and 308. Next, the operator selects the "pressure tensioning mode" control 316 and selects an appropriate pressure, such as between about 10 PSI (nominally, about 70 kPa) and about 145 PSI (nominally, about 1000 kPa), preferably between about 15 PSI (nominally, about 100 kPa) and about 75 PSI (nominally, about 520 kPa), even more preferably between about 25 PSI (nominally, about 170 kPa) and about 50 PSI (nominally, about 345 kPa), and in one embodiment about 30-40 PSI (nominally, about 200-275 kPa). As the BOP stack is deployed (via its own controls and/or gravity) the line tension changes because, for example, the relative positions of the BOP stack and the rig may have changed due to water movement. In response, the system may either wind in the cable/hose (as the reel is set to "reel-in") or allows slippage (via regulator 72 shown in FIG. 6) as necessary to maintain the selected tension. In addition, because the operator is able to read the line tension 344 as measured by a sensor 502 on the turn down sheave 500 (described below in FIG. 8), the operator may be able to adjust the tension by selecting the appropriate controls 318 and 320 to fine tune the operation of the system.

In some embodiments, selection of a user interface control 302-330 may cause a series of operations to be performed. For example, selection of the "pressure tensioning mode" control 316 may select a "tensioning" mode to be activated and may also cause the drive motor 100 to rotate to wind in the cable or hose. Other combinations of operations may also be triggered by selection of a single interface control 302-330.

An operator may toggle control of the system between a local control unit 300 and a remote control unit 400 (described below with reference to FIG. 7) by selecting either the "local reel control" interface control 322 or the "remote reel control" 324.

3.0 Exemplary Electro-Pneumatic Drives 200

Referring again to FIGS. 2-4, the electro-pneumatic drive system 200 may receive control signals from the local control unit 300 (and/or the remote control unit 400 described below) and, in response, may power the reel motor 100 to wind the cable on the spool 60 and run the level wind 64, among other features described above.

FIG. 6 shows a schematic diagram of one embodiment of an electro-pneumatic drive system 200. In one embodiment, this system 200 comprises a pneumatic air supply that may supply 340 standard cubic feet per minute (SCFM) up to about 145 PSI (nominally, about 1000 kPa), and typical up to about 120 PSI (nominally, about 830 kPa). Other volumetric flow rates and pressure values may be used. In the illustrated embodiment, the air supply may be connected to the electro-pneumatic drive unit 200 through an air filter 70, air regulator 72 and air lubricator 74, which may comprise Norgren models F17-800 A3DA, R24-801-RGNA, and L17-800-MPDA, respectively. A control panel 75 includes solenoid valves 80 and 84 and proportional pressure control valves 87, 88 and 89. The solenoid valve 80 may be provided for controlling the reel direction (i.e. "reel in" and "reel out") and may comprise a Versa series VGG-4304-316-XMFA. A similar solenoid valve 84 may be provided for selecting system pressure and mode of operation may comprise a Versa series VGG-4302-316-XMFA. The proportional pressure control valve 87, which may be of the type Norgen VP5010PK411H00, may feed the air regulator 94 for speed regulation. An output of the air filter 70 may be connected with the same line to solenoid valves 80 and 84 and proportional pressure control valve 87.

The proportional pressure control valves 87, 88, and 89 may receive a variable input signal ranging from about 4 to about 20 mA and may output a variable pressure from about 0 psi to about 140 psi.

The outlets of the solenoid valve 84 feed pilot inputs to proportional pressure valves 88 and 89, thereby allowing an operator to select between a "normal" pressure mode and a "tensioning" pressure mode as described in more detail below. The output of these valves 88 and 89 are variable as a function the pilot input and fed to the air regulator 72 via a shuttle valve 90. The proportional pressure valves 88 and 89 may be of the type Norgren VP5010K411H00, while the valve 90 may be a Versa SV-3-316.

The air motor 100 receives an air supply from an air valve 101, which in turn is supplied by the air relay valve 94 and has pilot inputs from the solenoid valve 80. The valve 101, an integral part of air motor 100, has two outputs, each of which feeds one side of the air motor 100, in order to drive the air motor, and therefore the spool, in both directions. For the larger diameter valve 101, as well as for air motor 100, which drives the spool 60, the silencers may be of the type Allied Witan #0383007, or #0383010.

The air motor 100 may drive the spool through a planetary reducer 130. The planetary reducer may be of the type Brevini #PWD3200/SF/144/00/R33. Planetary reducer 130 may be used to slow the speed of the output from air motor 100. It also may increase the torque applied by air motor 100.

A disc brake caliper 120 for the motor 100 braking system may be interconnected to the air control system by way of shuttle valve 92 and a quick exhaust valve 124, which may be of the type Versa #QE-3-316. The brake caliper 120 may be configured like a typical air brake, i.e. held in the applied position by spring pressure (not shown) and air pressure is used to release the brake from engagement. In the illustrated embodiment, the air motor 100 is a radial piston motor, such as the Fenner SPX #R33-X-XX-R1.

Appropriate ball valves, needle valves, air exhaust silencers and pressure gauges, as indicated schematically, may be interposed in the various interconnecting lines in the diagram of FIG. 6.

4.0 Exemplary Remote Control Units 400

Referring again to FIGS. 2-4, an electrical interface 350 may be provided for attaching one or more remote control units 400. In one embodiment, the electrical interface 350 may be a multi-pin electrical connector such as an Amphenol Industrial Star-Line® series "ZP/ZR" connector or the like. In other embodiments, the remote-control may be coupled to the electro-pneumatic drive system 200 via a wireless interface, such as wireless local area network (WLAN) adaptor that comports to the Institute of Electrical and Electronics Engineers' (IEEE) 802.11 standards. Alternatively or additionally, other wireless communication interfaces, such as Bluetooth or ZigBee interfaces, may be provided.

Figure 7:
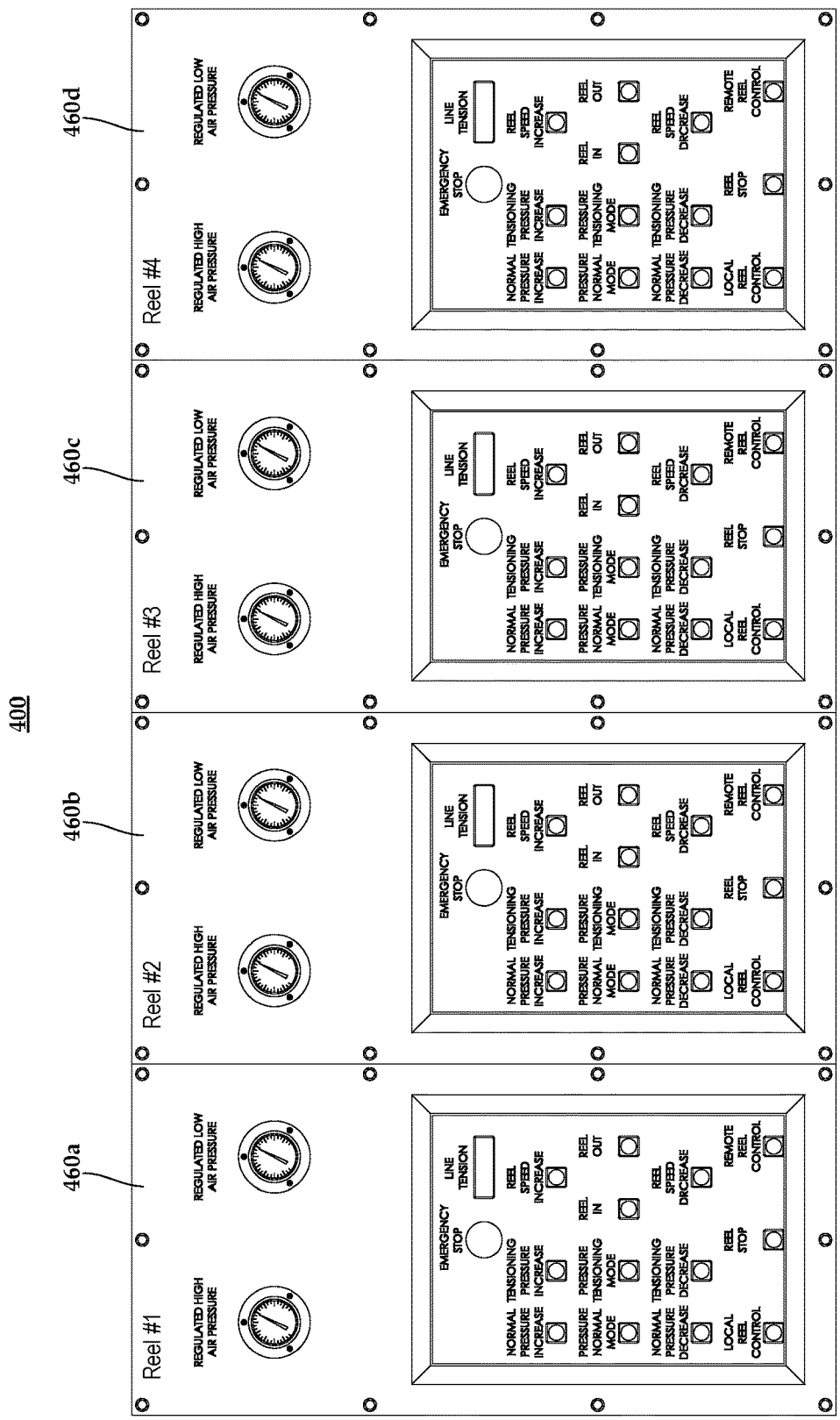
FIG. 7 shows an exemplary remote control panel for the configuration of cable reel assemblies shown in FIG. 1.

Referring to FIG. 7, an exemplary remote control unit 400 is shown. The remote control unit 400 may be substantially similar to the local control unit 300 shown in FIG. 5. For example, each of the user interface controls 302-330 and/or display controls 344 of the local control unit 300 may be mirrored on the remote control unit 400 (labeled with corresponding references numerals 402a-430a) and may operate as described above for the local control unit 300. The remote control unit 400 may connect with the electro-pneumatic control system 200 of FIG. 6 by way of an electrical interface 350, which essentially parallels the outputs of the local control unit 300.

The remote control unit may include a touchscreen interface to allow the operator to enter control inputs, log into the electronic control system, and view recorded data. The remote control screen may contain a computer to convert user inputs into control outputs and process the data received from the sensors on the sheave. The computer may run a desktop or mobile operating system, such as Microsoft® Windows®, or the like. The remote control unit may include a stainless steel cover which can be placed over the touchscreen to protect the touchscreen from damage from water, oil, and/or other debris. The touchscreen may be mounted at about a 45 degree angle to make operating the screen easier for the operator.

Figure 10:
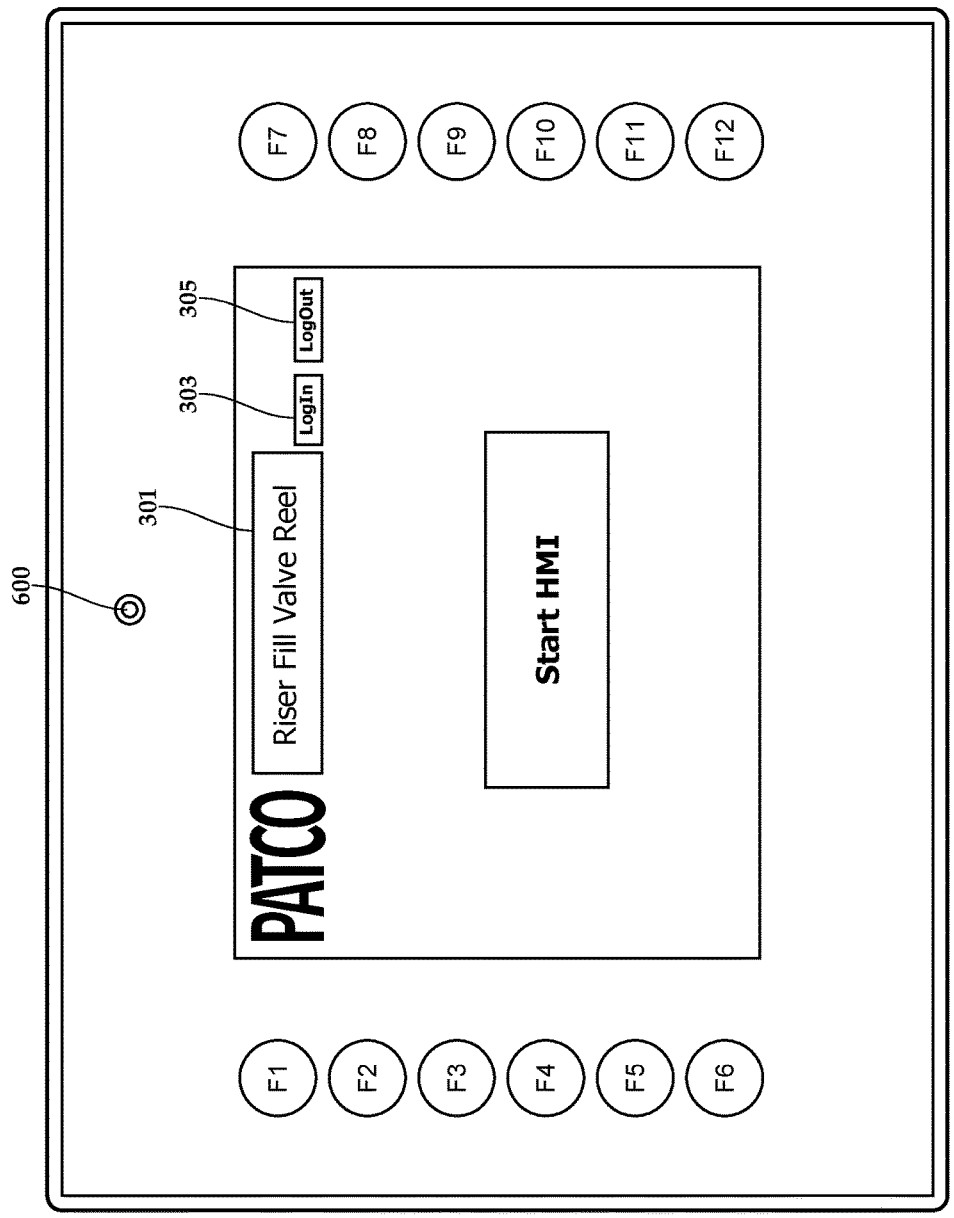
FIG. 10 shows an image of an exemplary remote control unit for use with a cable/hose reel assembly shown in FIG. 2.

The remote stand may also include a camera 600 located above the touchscreen as shown in FIG. 10. This camera 600 may take photos or video upon certain system events, such as when a user logs in, when a control input is made, or when the system activates an alarm. The remote control unit 400 and/or PLC may store the photo or video with other data logged from the system. The remote control unit 400 also may contain one or more input/output cards which received information from the sheave sensors and outputs data to the PLC. The sheave may be designed and manufactured to withstand a Class 1, Zone 1 classification based on those created by the National Fire Protection Association (NFPA).

In the illustrated embodiment, the remote control unit 400 may include a separate panel 460 for each reel assembly 10 coupled to the remote control unit 400. In some embodiments, the panels 460a-d may be color coded to indicate its corresponding reel assembly 10. Alternatively, or additionally, other indicia, such as text labels, may be used to indicate the associated reel assembly 10.

Selection of an interface control on either the local control unit 300 or the remote control unit 400 may cause indicia indicating the selection of the control and/or the currently selected mode of operation on the other control unit 300 and 400. For example, selection of the "reel-in" control 302 on the local control unit 300 of a reel assembly 10 may cause indicia indicating that the reel is currently winding the cable or hose, just as if the operator had selected the "reel-in" control 402 on the remote control stand. Notably, an operator may toggle control to the remote control unit 400 by selecting the "remote reel control" interface control for a given reel assembly 10. In response, indicia will be displayed on the local control unit 300 to indicate that the remote control unit 400 currently has control of the reel assembly 10.

5.0 Exemplary Turn Down Sheaves 500

Referring to FIG. 8, an exemplary turn down sheave 500 for use in a reel assembly having one or more electronic control units 300 and 400 is shown. The sheave 500 may include a load cell 502 or other sensor that measures a force applied at the sheave 500 relating to the cable/hose tension. Alternatively, or additionally, the sheave 500 may include a position sensor 504 (such as a rotary encoder, reed sensor or the like) that measures the length of cable/hose that has been deployed (i.e. fed out to the BOP stack). In one embodiment, the sheave 500 may transmit these measurements to the electro-pneumatic drive 200, which in turn transmits that information to the local control unit 300, the remote control unit 400, or both. Alternatively, or additionally, the sheave 500 may be directly coupled to the local control unit 300, the remote control unit 400, or both. In either case, the information received from the sensors 502 and 504 on the sheave may be directly displayed on the control unit 300, such as at interface controls 344 and 346, or may be mathematically manipulated, reformatted, or the like in order to be displayed on the control unit 300.

The sheave 500 shown in FIGS. 8 and 9 may have a plurality of rollers 506 to redirect and guide the cable, hose, or umbilical. The sheave 500 may have about three rollers 506 to about twelve rollers 506 and preferably about six rollers 506. Rollers 506 may be shaped to center the cable, hose, or umbilical in the center of the roller 506, such as a "U" cross-sectional shape. The operator may set up the sheave 500 using one or more rollers 506 to redirect the cable, hose, or umbilical at various angles ranging from about 10 degrees to about 180 degrees. The sheave also may include a tensioner to maintain contact between the cable, hose, or umbilical and the rotary encoder 504 to ensure the sensor accurately detects all movement of the cable, hose or umbilical. The tensioner may be adjusted by using a threaded screw to adjust the pressure of the tensioner on the cable, hose, or umbilical. Furthermore, the sheave may include one or more latches which fold over the sheave 500 and hold the cable, hose, or umbilical on the sheave rollers 506. The rollers 506 may be made from nylon or other polymers. Each roller 506 may be mounted to the sheave using a bolt which may be made from stainless steel.

The sheave 500 may measure the cable tension by using a load cell 502. The load cell 502 may be removably attached to the top of the sheave 500 and to a shackle for attachment to another cable or roof of the moon pool. The load cell 502 may output an analog signal to an enclosure on the sheave 500 which may contain a signal conditioner and one or more isolation barriers. Those devices may prepare the signal from the load cell 502 and rotary encoder 504 and send the signal to the local control unit 300 and/or remote control unit 400. The local control unit 300 and/or remote control unit 400 may convert the signal to a digital signal and may then send the digital signal to the PLC where it may be stored.

The sheave 500 also may have a rotary encoder 504 to measure the deployed length of cable, hose, or umbilical. The rotary encoder 504 may send an analog signal through the enclosure on the sheave 500 which may contain a signal conditioner and one or more isolation barriers. The rotary encoder 504 may be attached to a roller 506 which engages with the cable, hose, or umbilical and may have a diameter of about 1 inch. After sending the signal to the enclosure, the signal is sent to the local control unit 300 and/or remote control unit 400 where the signal may be converted to a digital signal, and then may be sent to the PLC where the signal may be converted to a linear length of deployed cable and displayed on the local or remote control stand. The PLC also may store the length of deployed cable.

5.1 Exemplary Automatic Control Based on Measured Parameters

In another embodiment of the "tensioning" or "automatic" mode of operation, the assembly 10 may maintain a substantially constant tension on the cable/hose by measuring one or more system parameters and automatically adjusting the behavior of the system 10 based on the measure parameter(s). For example, an operator may activate a tensioning mode of operation by setting a target tension via the "tension" interface controls 360 and selecting the "reel-in" control 302. Exemplary tensions may be between about 100 pounds and about 1000 pounds, preferably between about 200 pounds and about 600 pounds, even more preferably between about 250 pounds and about 500 pounds, and in some embodiments between about 300-400 pounds. In response, the system may wind in the cable/hose (as the reel is set to "reel-in") as necessary to maintain the selected tension.

As the BOP stack is deployed (via its own controls and/or gravity) the line tension changes because, for example, the relative positions of the BOP stack and the rig may have changed due to water movement. This condition may be detected, for example, by measuring line tension with load cell 502, which may transmit its output signal to a proportional-integral-derivative controller (PID controller or three term controller) 345 (FIG. 3). Because the system is able to monitor the line tension 344 as measured by the load cell 502 sensor on the turn down sheave 500, the system 10 may be able to automatically adjust the tension by transmitting appropriate control signals to the PLC. For example, when the PID controller 345 detects that the tension 344 exceeds the target value, the PID controller may operate with an output of zero until the tension is lower than the set point. Otherwise, if the tension is below the target tension, the PID controller may continue to "reel-in" the cable, hose or umbilical.

In some embodiments, the system 10 may allow the tension 344 to vary from the target tension within a predetermined limit before action is taken. For example, the system 10 may allow the tension 344 to exceed the target value by a predetermined percentage before action is taken. Exemplary percentages may include between about 5% and about 30%, preferably between about 10% and about 20%, and in some embodiments about 15%. Alternatively, or additionally, limits may be based on predetermined increments, such as 5 pounds, 10 pounds, 25 pounds, 50 pounds, 100 pounds, and the like.

The sheave 500 may be designed and manufactured to Det Norske Veritas (DNV) and/or American Bureau of Shipping (ABS) lifting standards. The sheave may also be designed and manufactured to adhere to the Class I, Zone 1 NFPA classification. The sheave 500 may be designed with different bend radii, ranging from about a 20 inch bend radius to about a 34 inch bend radius, and preferably about a 24 inch bend radius.

6.0 Exemplary Data Logging Features

The system 10 also may log data for creating and storing a record of the use of the system 10. In some embodiments, the system 10 may generate a transaction log of every input entered into the system 10 and each piece of data collected by the system 10 itself. Alternatively, or additionally, subsets of inputs and collected data may be logged. In one embodiment, the system 10 may log the following information for each input: the user account logged in at the time of the received input, the selected input (e.g., reel speed increase, tension setting adjustment, etc.), the new value of the set point, the previous value of the set point, and a time/date stamp. The system 10 also may log each control input data with a reason for the input as entered by the user. The system 10 also may log every instance of an alarm limit triggering, such as the initial triggering of the alarm and/or the clearing of the alarm. More or less information may be logged.

Furthermore, the system 10 may periodically sample data from various sensors, such as the load cell 502 or rotary encoder 504 on the sheave 500, and record and store the data. The data logged may include all system inputs and outputs, the system state, alarm conditions, calculated variables such as cable payout, and the like. The data may be periodically sampled at various periods. These data sampling periods may range from once per about 1 second to about 1 minute, preferably about 5 seconds to about 30 seconds, and most preferably about 10 seconds. In some embodiments, data may be recorded and stored whenever the system 10 also logs a control input or when an alarm limit is triggered.

Figure 21:
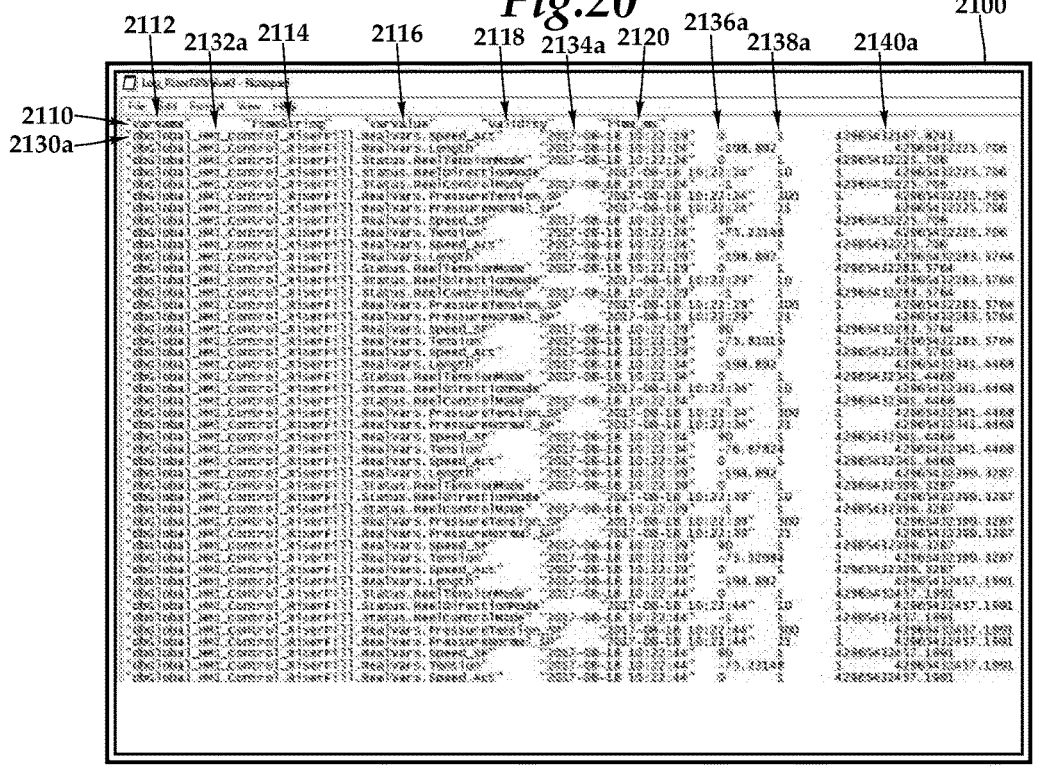
FIG. 21 shows an exemplary data log.

An exemplary data log 2100 is shown in FIG. 21. In the illustrated embodiment, the system 10 may record a pressure set point(s), a speed set point(s), line tension(s), system mode (e.g. manual or automatic), reel in settings, reel out settings, stop inputs, remote/local control settings, and the deployed length of the cable, hose or umbilical connection. For each entry in the log 2100, the system 10 may record a variable name ("VarName") 2112, the time the data was logged ("TimeString") 2114, the value of the variable ("VarValue") 2116, an indicator of the functioning of the system 10 ("Validity") 2118, and the recorded time of the variable change in the system ("Time_ms") 2120, the title of which may be included in the first line 2110 of the log 2100. For example, the first recorded entry 2130a in the illustrated log 2100 indicates that the value of "0" (2136a) was recorded for the variable "dbGlobal_HMI_Control_Riser-Fill.RealVars.Speed_Act" (2832a) at "2017-08-18 10:22:19" (2134a) while the system 10 was functioning in state "1" (2138a) indicating a valid connection between the to the PLC (as opposed to a zero entry that indicates no connection between the two). The entry 2130a also indicates that the system time was "42965432167.8241" (2140a) when this variable 2132a was changed to the recorded value 2136a. More or less information may be stored in the logs 2100.

Recorded data may be accessed via the local control unit 300, the remote control unit 400, or both. For example, a download option may be provided via a screen accessible to an administrative account user. The data may be stored locally using means such as a hard drive, solid state memory, or the like. In addition, the data also may be stored remotely, such as on a remote server computer, network attached storage, or the like. The data may be exported using a network connection, such as over a wired or wireless local area network using a wireless access point or Ethernet port.

Furthermore, the data may be exported using a computer port attached to a control unit, such as a universal serial bus (USB) port, IEEE 1394 port, or the like.

FIG. 11 shows an enclosure which may be used on a reel assembly 10. This enclosure may contain the PLC and power supply for the reel assembly. The enclosure may include a plurality of bolt holes to further anchor the enclosure lid shut. The enclosure may include a power toggle switch 332 and an emergency kill switch 330. When the emergency kill switch 330 is activated, the system may interrupt any control signal and may purge the solenoid and/or proportional valves of air which may cause the reel assembly to stop.

Unlike purely pneumatic systems that suffer performance inherent limitations such as degradation over long distances, use of the local and remote electronic control units 300 and 400 in cooperation with an electro-pneumatic drive unit 200 as described herein virtually eliminates any loss in system response time and enables a reel operator to control the system 10 from any location on the drilling rig. Alternatively, or additionally, the systems and methods described herein also may enable a "driller's console" to be established where the BOP stack deployment may be observed via a series of cameras and the operator may manipulate the system via a remote electronic control unit 400 and even select control of a particular reel assembly 10 directly from the remote stand.

7.0 Exemplary Retrofit Kit

A kit may be provided for retrofitting certain above disclosed features to other reel systems, such as pneumatic reel systems. These systems may lack electro-mechanical control systems, a remote control unit, or other features disclosed herein. For example, the kit may include a local control touchscreen, remote control unit, sheaves with load cells and rotary encoders or other sensors, and a plurality of electro-pneumatic control valves and solenoid valves for connecting to an existing pneumatic control system. In one embodiment, the kit also may include a touch screen for the local control unit, 2 electronics enclosures for a controller and for the control valves, two solenoid valves, and three electro-pneumatic proportional valves. The solenoid valves may be the same as valves 80 and 84 described above and shown in FIG. 6. Furthermore, the electro-pneumatic proportional valves may be the same as valves 87, 88, and 89 as described above and shown in FIG. 6. The controller may comprise a programmable logic controller (PLC) and a power supply. The kit also may include one or more brackets for mounting the enclosures to the reel assembly. These brackets may be made from assembled angle iron. The kit also may include all necessary wiring, mounts, cables, fasteners, and other hardware required to install the components of the kit.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A reel assembly for accepting, holding, and deploying cable, hose, umbilical connection or the like, comprising:
a spool assembly including a frame and a drum mounted in said frame, the drum including a core and end flanges for storing said cable, hose or umbilical connection;
an air motor;
an electro-pneumatic drive unit including a plurality of pneumatic valves, electro-pneumatic valves, or both, the air motor coupled to the drum via the electro-pneumatic drive unit;
an electronic control unit coupled to the electro-pneumatic drive unit, where the electronic control unit receives a first input from a digital input device and transmits electrical signals to the electro-pneumatic drive unit to cause the electro-pneumatic drive unit to control the motor to rotate the drum, where the electronic control unit receives a second input and transmits electrical signals to the electro-pneumatic drive unit to cause the electro-pneumatic drive unit to increase or decrease an air pressure associated with the assembly.

2. The reel assembly of claim 1, where the digital input device includes a touchscreen.

3. The reel assembly of claim 1, where the electronic control unit is fixedly attached to the frame.

4. The reel assembly of claim 1, where the electronic control unit displays status information.

5. The reel assembly of claim 4 further comprising a sheave coupled to one or more sensors that determine either a force applied to the sheave, a length of cable, hose or umbilical connection deployed, or both.

6. The reel assembly of claim 5, where the sheave is coupled to the electronic control unit, the electronic control unit receives information indicative of either the determined force, the length of cable, hose or umbilical connection deployed, or both.

7. The reel assembly of claim 6, where the electronic control unit displays either a line tension value, a deployed cable, hose or umbilical connection length value, or both, based on the received information.

8. The reel assembly of claim 6, where the electronic control unit stores a log of the received information.

9. The reel assembly of claim 6, where the control unit controls the operation of the reel based on the received information.

10. The reel assembly of claim 6, where the control unit includes a PID controller that processes the received information and controls the operation of the reel when the received information exceeds a predetermined target value.

11. The reel assembly of claim 6, wherein the electronic control unit provides user interface controls for setting an alarm value for the received information and notifies a user when the preset alarm value is exceeded.

12. The reel assembly of claim 1, where the electronic control unit includes a plurality of user accounts having associated control permissions.

13. The reel assembly of claim 1, where the electronic control unit stores a log of received user inputs.

14. A retrofit kit for a pneumatically controlled reel assembly for accepting, holding, and deploying cable, hose, umbilical connections or the like, including a reel and a pneumatic drive unit for rotating the wheel, the kit comprising:
an electronic remote control unit for controlling one or more reel assemblies;
one or more local control units for controlling each of one or more reel assemblies;
one or more sets of electro-pneumatic valves for operatively coupling the pneumatic drive unit of the reel assembly to either the local or remote control unit of one reel assembly; and
a sheave comprising a load cell and rotary encoder for redirecting the direction of laid cable, hose, or umbilical connection and for measuring the line tension and deployed length of cable, hose, or umbilical connection, wherein the sheave is operably coupled to the local control unit, remote control unit, or both to transmit the measured line tension and deployed length.

15. The retrofit kit of claim 14, where the local control unit displays either a line tension value, a deployed cable, hose or umbilical connection value, or both, based on the received information.

16. The retrofit kit of claim 14, where the local control unit controls the operation of the reel based on the received information.

17. The retrofit kit of claim 14, where the remote control unit controls the operation of the reel based on the received information.

18. The retrofit kit of claim 14, wherein the local control unit provides user interface controls for setting an alarm value for the received information and notifies a user when the preset alarm value is exceeded.

19. The retrofit kit of claim 14, where the local control unit stores a log of the received information.

* * * * *